US007296091B1

(12) United States Patent
Dutta et al.

(10) Patent No.: US 7,296,091 B1
(45) Date of Patent: Nov. 13, 2007

(54) SYSTEM AND METHOD FOR RECEIVING OVER A NETWORK A BROADCAST FROM A BROADCAST SOURCE

(75) Inventors: Ashutosh Dutta, New York, NY (US); Henning Schulzrinne, New York, NY (US); Yechiam Yemini, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 958 days.

(21) Appl. No.: 09/596,864

(22) Filed: Jun. 19, 2000

(51) Int. Cl.
*H04Q 7/36* (2006.01)
*G06F 15/16* (2006.01)
(52) U.S. Cl. .................. 709/245; 709/244; 370/331
(58) Field of Classification Search ................ 709/230, 709/231, 237; 725/91, 116; 345/721; 370/401, 370/389
See application file for complete search history.

(56) References Cited

U.S. PATENT DOCUMENTS

| | | | |
|---|---|---|---|
| 5,253,341 A | 10/1993 | Rozmanith et al. | 709/219 |
| 5,572,678 A | 11/1996 | Homma et al. | 709/237 |
| 5,727,002 A | 3/1998 | Miller et al. | 709/237 |
| 5,748,736 A | 5/1998 | Mittra | 713/163 |
| 5,757,798 A * | 5/1998 | Hamaguchi | 725/116 |
| 5,778,187 A * | 7/1998 | Monteiro et al. | 709/231 |
| 5,892,535 A * | 4/1999 | Allen et al. | 725/91 |
| 5,893,091 A | 4/1999 | Hunt et al. | 707/10 |
| 5,903,559 A | 5/1999 | Acharya et al. | 370/355 |
| 5,990,883 A * | 11/1999 | Byrne et al. | 345/721 |
| 6,085,101 A | 7/2000 | Jain et al. | 455/500 |
| 6,101,180 A * | 8/2000 | Donahue et al. | 370/389 |
| 6,108,706 A * | 8/2000 | Birdwell et al. | 709/230 |
| 6,119,007 A * | 9/2000 | Chater-Lea | 455/442 |
| 6,266,339 B1 * | 7/2001 | Donahue et al. | 370/432 |
| 6,665,727 B2 * | 12/2003 | Hayden | 709/231 |
| 6,671,276 B1 * | 12/2003 | Bakre et al. | 370/401 |
| 6,741,575 B1 * | 5/2004 | Zhang et al. | 370/401 |

OTHER PUBLICATIONS

Almeroth et al., Using Satellite Links as Delivery Paths in the Multicast Backbone (MBone) WOSBIS 98, pp. 47-54, Dallas, Texas, Oct. 30, 1998.*
Ryu, Bo et al., Managing IP Services over a PACS Packet Network, IEEE Network, Jul./Aug. 1998, pp. 4-10.*

* cited by examiner

*Primary Examiner*—Patrice Winder

(57) ABSTRACT

A system and method for providing a broadcast to a receiver via a communication network. In particular, the broadcast is received via at least one global multicast channel. At least one local multicast channel is associated with the global multicast address. Then, a communication link is established between the receiver and the local multicast channel, and the broadcast is routed from the global multicast channel to the local multicast channel to provide the broadcast to the receiver. The number of the receivers which are receiving the broadcast may be determined. The receiver may include an Internet Protocol (IP) interface which enables the receiver to receive the broadcast via an IP-type multicast communication. The receiver may also be wireless, and can receive the broadcast in a first subnet using a multicast communication. Prior to the receiver moving to a second subnet, a request is generated by the receiver to receive the broadcast in the second subnet. After receiving the request, the broadcast is provided to the wireless receiver in the second subnet using the multicast communication.

10 Claims, 13 Drawing Sheets

SYSTEM AND METHOD FOR RECEIVING OVER A NETWORK A BROADCAST FROM A BROADCAST SOURCE

FIELD OF THE INVENTION

The present invention relates to a system and method for providing a broadcast over a network to a client. In particular, the system and method utilize network multicast communication for providing the broadcast of content between a broadcast source and the client to avail a global content and/or a local content to user.

COMPUTER PROGRAM LISTING APPENDIX

A computer program listing appendix on compact disk which shows an exemplary embodiment of the implementation of the system and method according to the disclosed subject matter is incorporated-by-reference herein in its entirety. The compact disk includes the following files: ADControls.java, created Jul. 20, 1999 and having 6,067 bytes; Announcer.java, created Jul. 20, 1999 and having 4,032 bytes; AudioOutputStream.java, created Jun. 15, 1999 and having 8,273 bytes; CDPPacket.java, created Jun. 15, 1999 and having 4,412 bytes; Base64.java, created Jun. 15, 1999 and having 18,614 bytes; Channel.java, created Jul. 20, 1999 and having 25,254 bytes; ChannelMonitorApplet.java, created Jul. 20, 1999 and having 10,779 bytes; ChannelStatistics.java, created Jun. 15, 1999 and having 1,006 bytes; CommercialSchedule.java, created Jun. 15, 1999 and having 6,028 bytes; InsertAd.java, created Nov. 16, 2006 and having 3,772 IRC.java, created Jul. 19, 1999 and having 8,991 bytes; IRCActionHandler.java, created Oct. 26, 2006 and having 1,415 bytes; IRCControls.java, created Oct. 26, 2006 and having 1,244 bytes; IRCDirectory.java, created Oct. 26, 2006 and having 3,714 bytes; IRCUsrApplet.java, created Jul. 20, 1999 and having 7,406 bytes; LAS.java, created Jun. 15, 1999 and having 838 bytes; MaddrDispenser.java, created Nov. 20, 2006 and having 3,529 bytes; MaddrServer.java, created Jul. 17, 1999 and having 4,595 bytes; MaddrServerInterf.java, created Jul. 17, 1999 and having 992 bytes; Marconi.java, created Nov. 16, 2006 and having 5,522 bytes; MarconiServer.java, created Jul. 21, 1999 and having 23,458 bytes; md5c.c, created Nov. 16, 2006 and having 9,941 bytes; NewEdit.java, created Nov. 24, 2006 and having 5,848 bytes; random32.c, created Nov. 16, 2006 and having 1,553 bytes; RAS.c, created Nov. 16, 2006 and having 13,569 bytes; ASActionHandler.java, created Jun. 15, 1999 and having 1,615 bytes; RASControls.java, created Jun. 15, 1999 and having 6,062 bytes; RASDirectory.java, created Jun. 15, 1999 and having 7,169 bytes; RASManager.java, created Jun. 15, 1999 and having 673 bytes; RASMessageBoard.java, created Jun. 15, 1999 and having 3,698 bytes; RASMgrApplet.java, created Jul. 20, 1999 and having 6,165 bytes; RSC.java, created Jul. 19, 1999 and having 1,130 bytes; RsSendRTCP.java, created Nov. 16, 2006 and having 4,956 bytes; RTSPServerControl.java, created Jun. 15, 1999 and having 8,921 bytes; SAPPacket.java, created Jun. 15, 1999 and having 7,372 bytes; Schedule.java, created Nov. 16, 2006 and having 5,201 bytes; SDPConnection.java, created Jun. 15, 1999 and having 2,965 bytes; DPMedia.java, created Jun. 15, 1999 and having 4,114 bytes; SDPOrigin.java, created Jun. 15, 1999 and having 2,462 bytes; SDPPacket.java, created Jun. 15, 1999 and having 18,741 bytes; extEdit.java, created Nov. 24, 2006 and having 1,882 bytes; and Vector2.java, created Jun. 15, 1999 and having 1,344 bytes.

BACKGROUND INFORMATION

Conventional radio systems broadcast a continuous content without requiring extensive user interaction. This traditional scheme is convenient in situations where the listener is sharing his or her attention with other tasks, such as driving an automobile. However, one of the disadvantages of these conventional radio systems is that only a limited number of the radio stations can legally transmit their broadcasts in a particular area (e.g., only 45 FM radio stations can transmit their broadcast in the New York City metropolitan area). There have been a number of proposed solutions to address this limitation. However, none of the proposed solutions effectively utilized the Internet to expand the number of radio broadcasts, as well as television broadcasts, to the wireless users who travel from one geographical area to another.

A streaming real-time multimedia content (which relates to entertainment, music and/or interactive game industries) can now be provided over the Internet. The streaming applications include IP telephony, broadcasting multimedia content and multi-party conferences, collaborations and multi-player games. However, at least one publication (i.e., the New York Times) asserted that such multimedia streaming applications will bring about the demise of the Internet because the streaming applications are far more demanding in terms of bandwidth, latency and reliability than the traditional data communication applications. Many of the existing streaming systems do not scale to large audiences, particularly for a transmission at high bit rates. They also do not provide a user flexibility, and are restricted to a utilization of either conferencing or broadcast modes.

Early attempts to provide the streaming applications to the clients over the Internet have been implement using a unicast scheme. An exemplary system illustrating the system which utilizes the conventional unicast architecture is shown in FIG. 1. Referring to FIG. 1, the source 100 (e.g., the audio and/or video content provider) is connected to a first router R1, which in turn is connected to second and third routers R2, R3. The second router R2 is connected to fourth and fifth routers R4, R5, while the third router R3 is connected to sixth and seventh routers R6, R7. The fourth router R4 is connected to two clients C0, C1, the fifth router R5 is connected to three clients C2, C3, C4, the sixth client R6 is connected to two clients C5, C6, and the seventh client R7 is connected to another three clients C7, C8, C9. The clients C0-C9 may be computers requesting the particular multimedia content (e.g., an audio and/or video content).

In operation, if each of the clients C0-C9 requests the same multimedia content, each of those requests is routed via their respective routers to the source 100. Particularly, the clients C0, C1 send such request to the fourth router R4 which routes the request two streams for the particular multimedia content, i.e., one stream for each of its requesting clients C0, C1. At the same time, the fifth, sixth and seventh routers R5, R6, R7 may receive the requests for the same multimedia content from its respective clients C2-C9, and these routers R5, R6, R7 route their streams, respectively, for such multimedia content upstream. The requests for two and three identical multimedia streams (i.e., a total of five streams) are sent to the second router R2 from the fourth and fifth routers R4, R5, respectively. The requests for the same three and two multimedia streams (i.e., also a total of five streams) are sent to the third router R3 from the sixth and seventh routers R6, R7, respectively. The second and third routers R2, R3 each route the request for five multimedia streams to the first router R1, which routes a request for 10 multimedia streams (i.e., 5 for the second router R2 and 5 for the third router R3) to the source 100.

Thus, the source 100 receives a request for 10 multimedia streams, and then transmits 10 multimedia streams to the first router R1, which then routes the requested 5 identical multimedia streams to the second router R2, and the same 5 multimedia streams to the third router R3. The second router R2 then routes two of these multimedia streams to the fourth router R4, and three to the fifth router R5. The fourth router R4 routes 1 stream to the client C0 and the other stream to the client C1. The fifth router R5 routes one of its received streams to the respective client, C2, C3, C4. Similar routing of the multimedia streams occurs for the third router R3 (and thus for the sixth and seventh routers, (R6, R7).

By utilizing the unicast scheme described above and shown in FIG. 1, there may be multiple copies of the same multimedia content being transmitted from the source down to the clients. Such transmission of multiple streams may cause a bottleneck in the network by wasting the Internet bandwidth, and would likely prevent the clients from receiving the multimedia content in an expeditious manner.

FIG. 2 shows an arrangement utilizing a conventional multicast communications scheme which addressed at least some of the above-mentioned drawbacks. For the sake of simplicity, the multicast arrangement in FIG. 2 is substantially similar to that shown in FIG. 1. Using the multicasting communications scheme illustrated in FIG. 2, if each of the clients C0-C9 requests the same multimedia content, the routers keep track of the particular client which made the request, and only sends one request for the multimedia stream upstream to the next router in the chain (or to the source 100). For example, the clients C0, C1 may send such request (e.g., a join request) to the fourth router R4, which stores an indication (e.g., a state) therein that at least one of clients C0, C1 sent the particular request. At the same time, the fifth, sixth and seventh routers R5, R6, R7 may receive the requests for the same multimedia content from its respective clients C2-C9, and each these routers R5, R6, R7 stores an indication therein regarding that at least one of their respective clients sent the request for multimedia stream. If the fourth router R4 (or the fifth router R5) already routed the multimedia streams to one of its clients (on the same subnet as the requesting client), it routes the multimedia streams to such requesting client. Otherwise each of the fourth and fifth routers R4, R5 sends a request to receive the multimedia stream that was requested by their respective clients C0-C4 to the second router R2. The second router R2 stores an indication that at least one of the fourth and fifth routers R4, R5 made the request. Each of the sixth and seventh routers R6, R7 also may send a request for the multimedia stream (i.e., that was requested by their respective clients C5-C9) to the third router R3. The third router R3 stores an indication which is similar to the one stored in the second router R2. Then, the second and third routers R2, R3 each send the request for the same multimedia stream to the first router R1, which stores an indication regarding which of the routers R2, R3 made the request. Since the first router R1 is directly connected (or connected in the same subnet) to the source 100, the first router R1 always receives the multimedia stream from the source 100.

In this manner, the first router R1 receives the request, duplicates the received multimedia stream (via multicast channels 500) and transmits 1 copy thereof to each of the second and third routers R2, R3 (if both made the request). The second router R2 then duplicates the received multimedia stream provided in the multicast channels 500, and sends one copy of the stream to each of the fourth and fifth router R4, R5. The fourth router R4, in turn, provides one copy of the received multimedia stream provided in the multicast channels 500 to the client C0 and the other copy to the client C1 (if both made the request). The fifth router R5 duplicates the received multimedia stream, and sends one copy of the received multimedia stream provided by the multicast channels 500 to each of the respective client C2, C3, C4 (if each of theses clients made the request). A similar transmission of the multimedia streams occurs for the third router R3 (and thus for the sixth and seventh routers R6, R7).

With this multicast scheme, the source 100 needs to only transmit one multimedia stream to the requesting router, which in turn duplicates the multimedia stream (if necessary) and transmits a single stream downstream to the routers and/or the clients requesting such stream. Indeed, each router (as well as the source 100) does not need to transmit more than one multimedia stream to the downstream routers. As such, the bandwidth of the system is utilized more efficiently.

In addition, by using the multicast scheme described above, it is also possible to avoid a transmission of a request for the multimedia stream (that has already been provided to other clients by a particular router) upstream, all the way up to the source 100. For example, another client C10 may be connected to the fourth router R5, and this new client C10 may request the multimedia stream from the fourth router R4 that has already been requested (and is provided to) the client C1. When the fourth router R4 receives this request from the new client C10, it checks whether the requested multimedia stream has already been provided to it. If not, this request is then passed to the second router R2. If the fourth router R4 determines that the requested multimedia stream is already provided by it to at least one of its clients (is in the present exemplary case to the client C1), the fourth router sends a copy of the requested multimedia stream to the new client C10 without sending additional requests for this multimedia stream to the second router R2, and ultimately to the server. Even though this multicast communications scheme provides an advantageous transmission of the multimedia streams from the servers to the clients, it was not effectively usable for wireless communication or in systems where the broadcast streams from different sources which can immediately be provided to the wired or wireless clients.

Previous attempts to provide next-generation radio and television systems have not been successful largely because these systems did not add significant benefits over the older and well known systems. Current versions of the Internet (or web) radio or television were not designed to utilize a large-scale multicast scheme, while also lacking the ability to support low-latency constraints and flexible programming (e.g., an automatic ad insertion during a program, an on-line monitoring of a particular channel, etc.). Furthermore, the conventional systems do not support a continuous streaming or conferencing, while the wireless client is moving, especially from one subnet to another.

SUMMARY OF THE INVENTION

A system and method according to the present invention is provided for transmitting and receiving broadcasts between a broadcast source and a client. One of the exemplary embodiments of the system and method utilizes the available Internet standards and protocols (e.g., RTP, RTCP, RTSP, SIP, SAP, SDP, UDP and IP multicast) to maximize their deployability. Other embodiments of the present invention utilize non-conventional technologies and/or protocols, such as a mobility-aware multicast scheme, a streaming protocol for wireless clients, a fast re-configuration, a bandwidth control for a multicast stream in a wireless network, etc. With the present invention, users can choose to tune-in to receive a local broadcast transmitted by a local station, a global broadcast transmitted by a global station.

The system and method according to the present invention can send broadcasts in a single area, as well as to multiple regions, where there are listeners/viewers who would like to receive the broadcast. This system and method also provides the ability for the end user to invite another user to a particular program using SIP (Session Initiation Protocol). Thus, with the present invention it is now possible to provide:

- Scalable mechanism for a selective content distribution with an automatic localized information insertion by using a hierarchical scope-based multicasting (e.g., global/local multicasting scheme) and local servers.
- Application-layer multicasting arrangement for the real-time broadcast traffic.
- Scalable hierarchical directory structure for an itemized content distribution.
- Support for global and local programs with possible ways of mixing the two.
- Popularity-based spectrum management to address the limits if the spectrum (e.g., a control mechanism for managing an audio/video stream based on a popularity of a particular program—capable of increasing the bandwidth of the broadcast which provides content for broadcasts which are popular with the users).
- Secure payment scheme between the content providers, advertisers and affiliates, which may be utilized for E-commerce.
- Support of a fast-handoff of the Internet Protocol multicast streams when the mobile clients move from one domain to another (e.g., moving in a car on a highway from one subnet to another) in a wireless environment. An application layer mobility protocol and a faster reconfiguration methodology can be provided for the wireless clients to implement such support.
- Distribution of a streaming content to the IP enabled wireless handset (e.g., IP enabled radio/television) using systems with wireless interface and a tuner.
- A combination of intra-ISP multicast with non-multicast global domain (e.g., the unicast domain).
- Support of IP multicast scheme for streaming (e.g., using the MP3 standard) over the bandwidth constrained wireless medium.
- Secure multicast environment to protect against malicious data senders.

One of the embodiments of the system of the present invention provides an architecture to facilitate an IP-based radio/television network, e.g., a streaming network. It can utilize the conventional Internet protocol suite to provide robust communication over conventional heterogeneous access networks. For example, the system and method can also utilize any wired and/or wireless layer-2 technology such as, e.g., PPP ("point to point protocol"), CDMA ("code division multiple access"), protocol based on IEEE 802.11 standard, DSL ("digital subscriber link") and Gigabit Ethernet. It is also possible to utilize the system and method of the present invention other network technologies. The local servers used in the system and method according to the present invention, as well as the use of application layer, provide an degree of scalability. The flexibility of radio services a better reach and a quality of service for the audio/video stream carried over IP are just a few of the other advantageous features of the system and method according to the present invention. Both wired and wireless links may be used for interconnection to the system and method of the present invention, as well as to include various throughput, delay, and error rates. The present invention provides flexible radio/television streaming services to the local Internet (e.g., multimedia clients which may not necessarily be supported by the traditional AM/FM or television receivers). The system and method of the present invention also provides the flexibility to the clients to be able to receive broadcast from any radio or television station in the world. It offers the capability of a hierarchical searching in terms of categories, and a way to insert local advertisements during commercial breaks. This will meet the challenge of bringing quality audio/video broadcast to the people in remote site, and to the wireless mobile clients. Radio Antenna Servers are provided in the local domains act as local stations/localized servers so as to determine how many people can listen to a particular radio/television station globally without a possible degradation of stream quality and provides the ability for the local listeners in a single domain to switch between the local program and the global program. These servers also provide the ability for the local listeners to receive the local advertisements during commercial breaks, while still being tuned to the global program or to continue listening to a particular segment of the global program while still being tuned to the local program. Another advantageous feature of the present invention is that the system and method allow any server connected to a communications network to be a potential broadcaster. The system and method also provides a pricing model which allows the servers (and possibly the broadcasters) to obtain a direct financial benefit therefrom.

As indicated above, the system according to the present invention is preferably transport independent, operates over wired and wireless links, and accommodates the mobility of the client. Therefore, the present invention provides a continuity to the listener of a particular program broadcast by the local or global station as the mobile client moves. The system and method according to the present invention can also utilize a network topology of highly malleable meshes which would include more than just static trees where each client (or node) can be mobile.

In an exemplary embodiment of the present invention, a broadcast is provided to a receiver via a communication network. The broadcast is received via at least one global multicast channel. At least one local multicast channel is associated with the global multicast address. A communication link is then established between the receiver and the local multicast channel, and the broadcast is routed from the global multicast channel to the local multicast channel to provide the broadcast to the receiver. The number of the receivers which are receiving the broadcast may also be determined. The receiver may include an Internet Protocol (IP) interface which enables the receiver to receive the broadcast via an IP-type multicast communication. The receiver may also be wireless, and can receive the broadcast in a first subnet using a multicast communication. Prior to the receiver moving to a second subnet, a request is generated by the receiver to receive the broadcast in the second subnet. After receiving the request, the broadcast is provided to the wireless receiver in the second subnet using the multicast communication.

The present invention will now be described by way of detailed description of exemplary embodiments thereby with reference to the drawings, in which:

DETAILED DESCRIPTION

A. System Architecture

Figure 1:
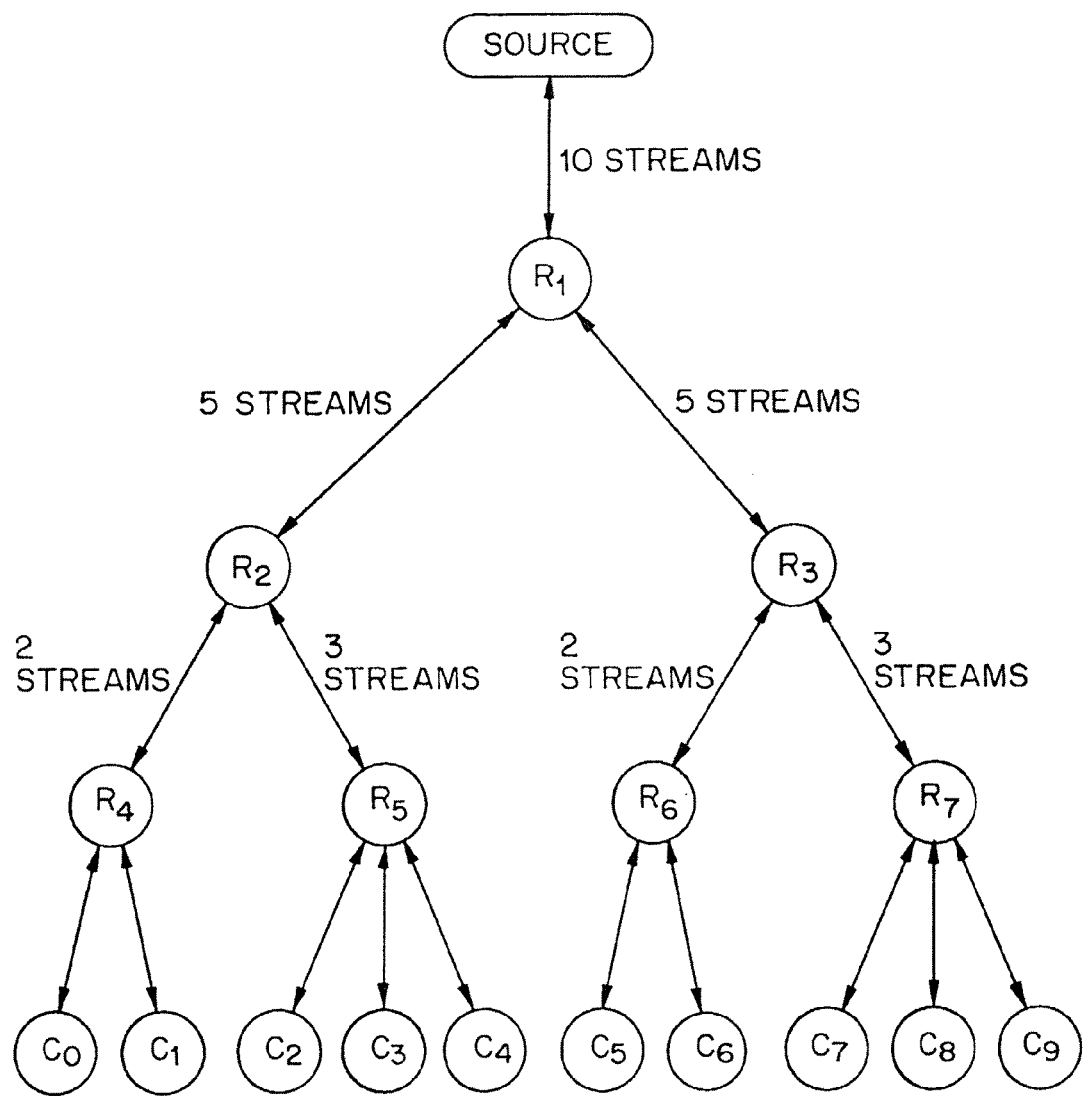
FIG. 1 is a high level functional diagram showing a network based broadcasting system which utilizes a conventional unicast communication scheme.
Figure 2:
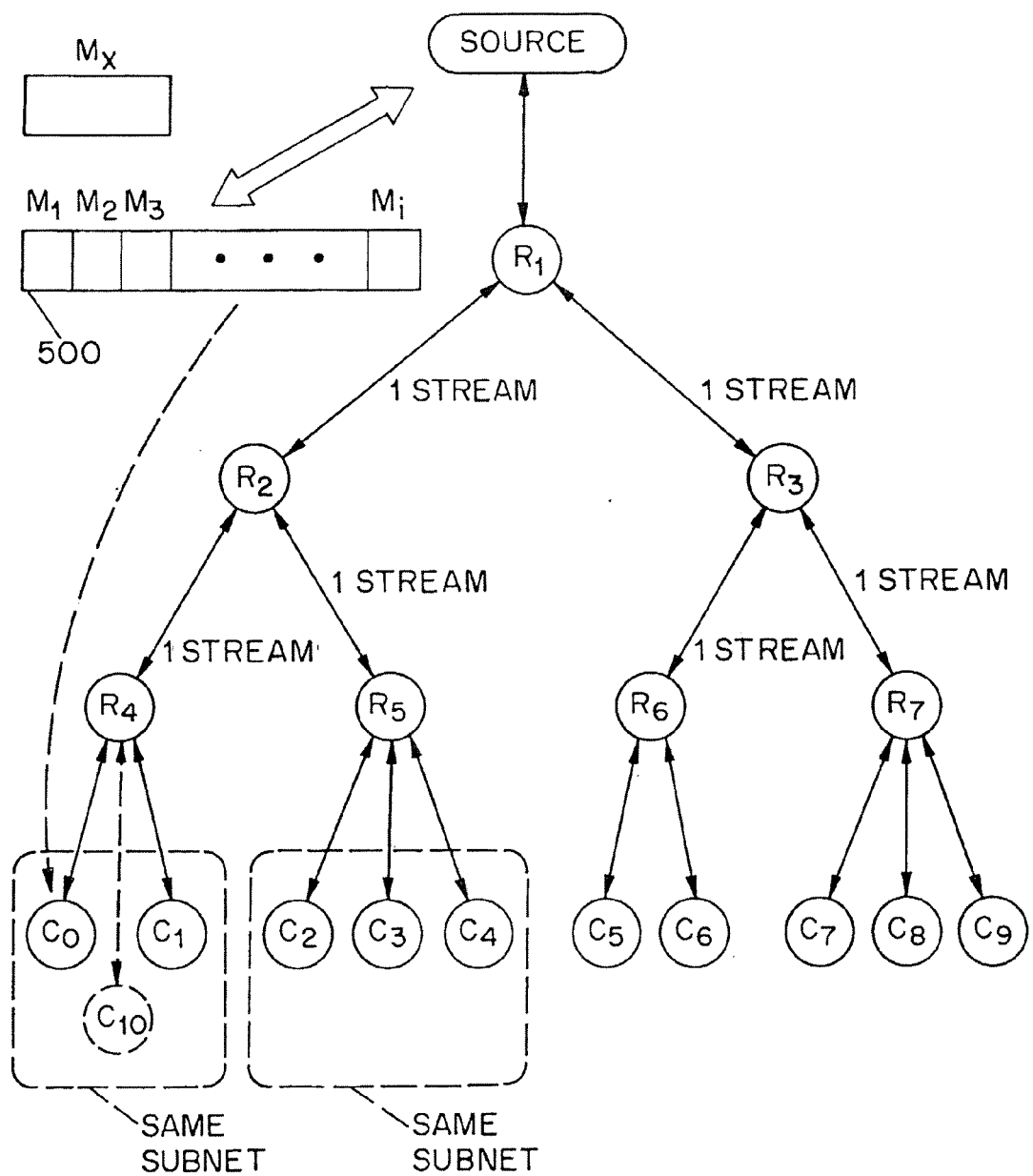
FIG. 2 is a high level function diagram showing a network based broadcasting system of FIG. 1 utilizing a conventional multicast communication scheme.
Figure 3:
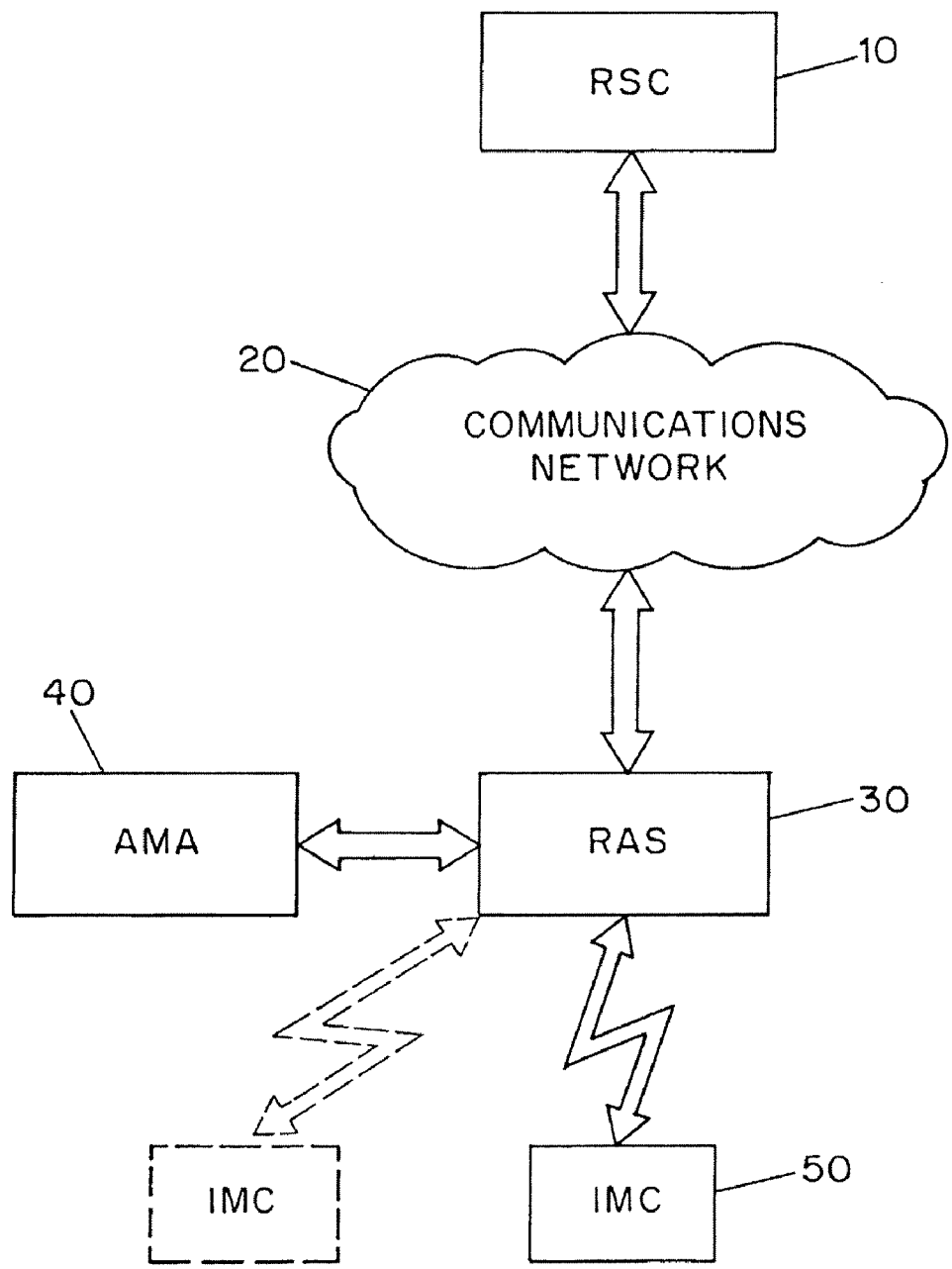
FIG. 3 is a functional block diagram showing an exemplary embodiment of a system according to the present invention which utilizes the multicast communication scheme for transmitting and receiving broadcast streams between a source and a client.

An exemplary embodiment of the system according to the present invention is shown in FIG. 3. The illustrated exemplary embodiment includes four functional components, I.e., a Radio Station Client (RSC) 10 or a Primary Station, a Radio Antenna Server (RAS) 30 or a local station, an Advertisement/Media Arrangement (AMA) 40 and at least one Internet Multimedia Client (IMC) 50. It should be understood that RSC 10 can be a television station client, and RAS 30 can be a television antenna server. IMC 50 can be a car radio or another reception unit which is capable of receiving a multicast broadcast. Such car radio may be an Internet-capable Radio as shall be described in further detail below. In operation, RSC 10 (e.g., a computing device with IP interface) transmits a global multimedia broadcast via a communications network 20 (e.g., the Internet). RAS 30 (e.g., also a server) can receive the global broadcast from the communications network 20, and make this broadcast available to IMC 50 using the multicast communication scheme described above with reference to FIG. 2 and as shall be described in further detail below. In addition, RAS 30 can broadcast a local broadcast to IMC 50, preferably also using the multicast communications scheme as shall be described below. AMA 40 is coupled to RAS 30 so as to insert additional content, indicating advertisements, into the particular segments of the global broadcast that is received from RSC 10 via the communications network 20. AMA 40 can be a separate server with its own storage database or a media database which is within RAS 30. IMC 50 can be used to receive the global broadcast (which may include additional content inserted by AMA 40) as well as a local broadcast by RAS 30.

Figure 4:
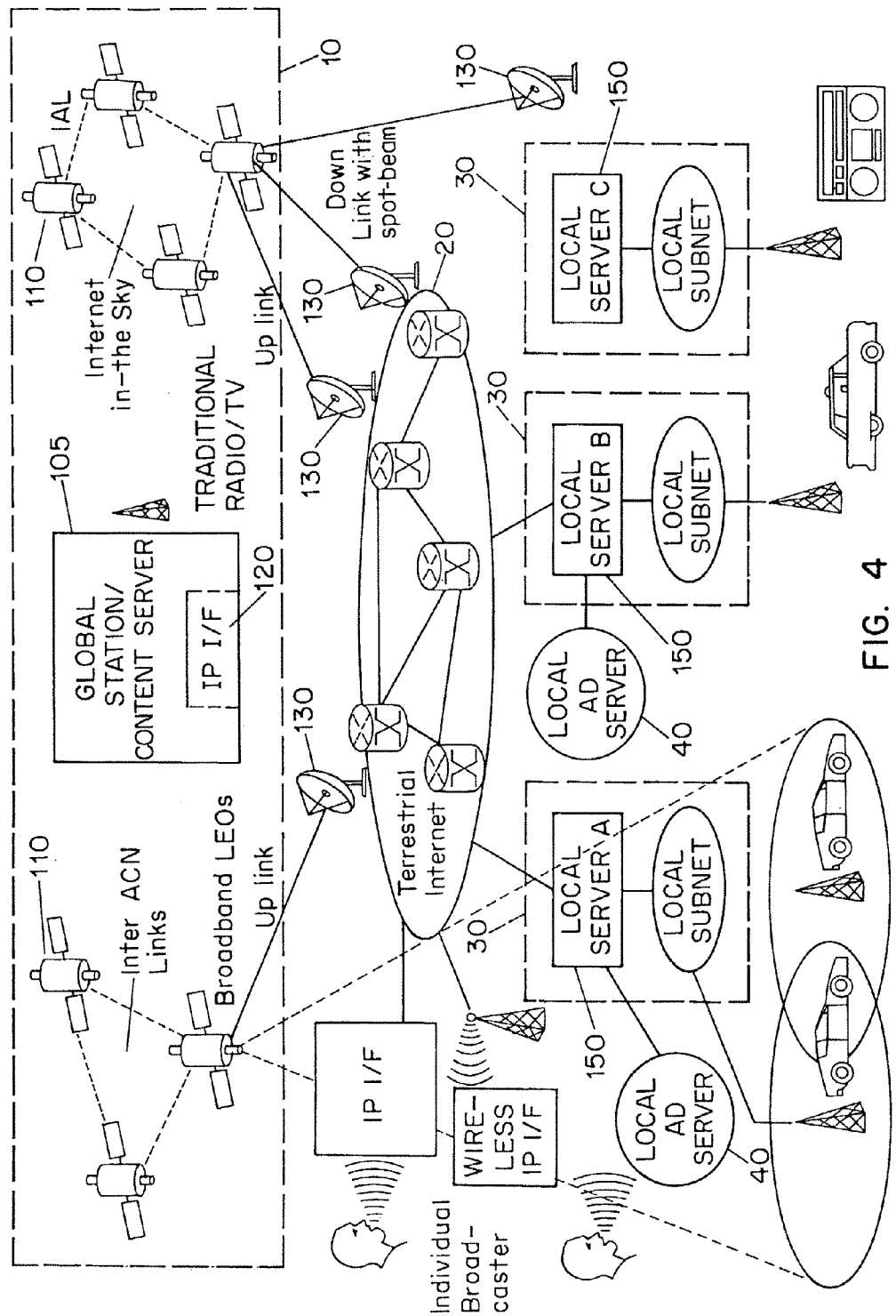
FIG. 4 is a functional system diagram showing an exemplary implementation of the system illustrated in FIG. 3.

An exemplary implementation of the system according to the present invention is shown in FIG. 4. In this implementation, RSC 10 may include a content server 105. The server 105 (via an Internet Protocol communication arrangement 120) transmits the global broadcast (e.g., the multimedia content) to an arrangement of routers 140 which are part of the Internet (i.e., the communications arrangement 20). These routers 140 deliver the global broadcast to a local server 150 (e.g., part of RAS 30), which can pass this global broadcast to IMC 50. The multimedia content may also be distributed via one or more broadband low earth orbiting satellites 110 to RAS 30, via an earth station arrangement 130. As indicated above, the local station 150 can also provide its own local broadcast to IMC 50. The exemplary implementation shown in FIG. 4 preferably utilizes the multicast communication throughout the system. However, if particular portions of the system are not capable of using such multicast communication, it is possible to utilize an alternate scheme in those particular portions as described in greater detail below. It is preferable to implement the multicast communication scheme described above with reference to FIGS. 2 and 4 between RSC 10 and RAS 30 as well as between RAS 30 and each IMC 50.

Figure 5:
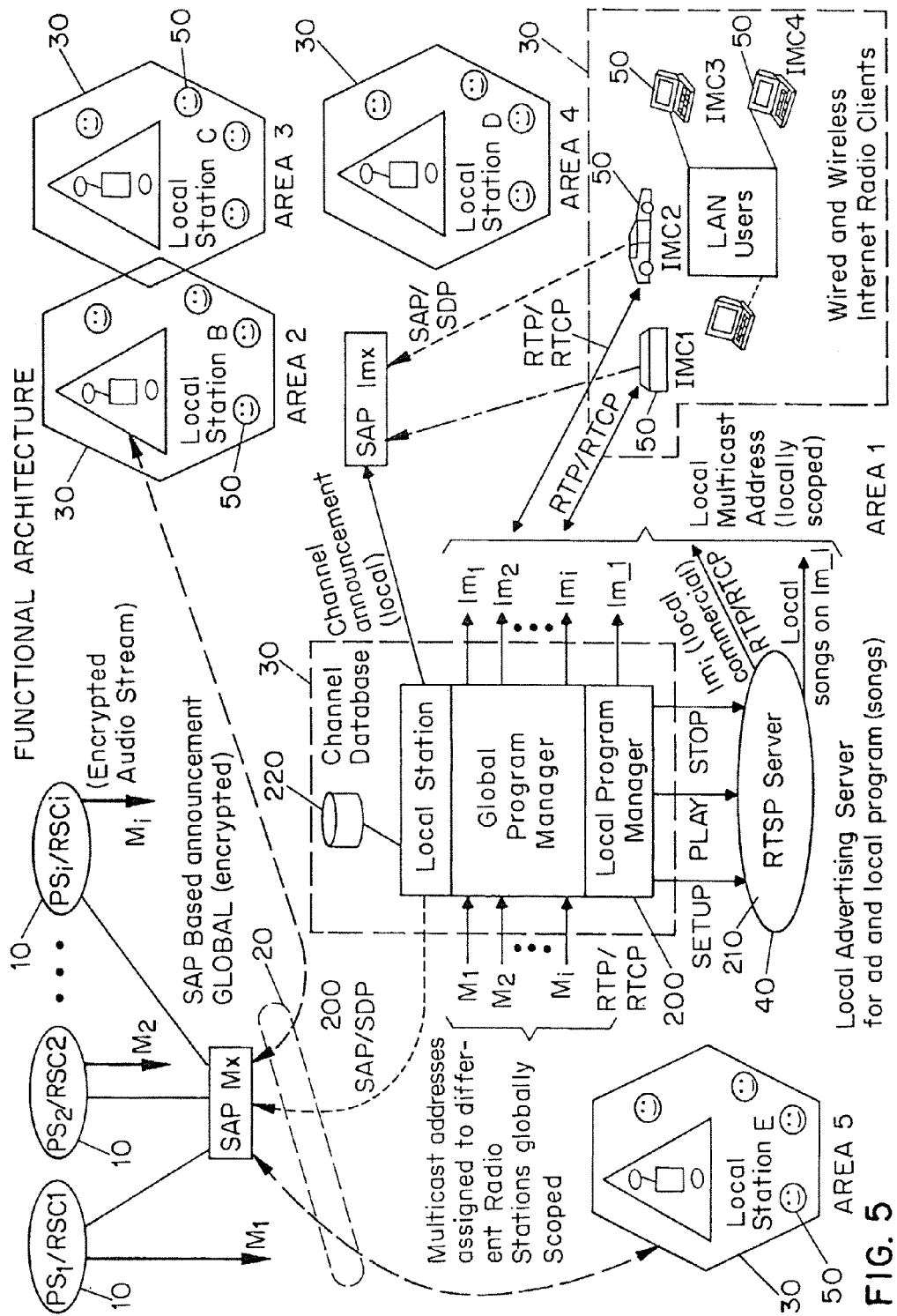
FIG. 5 is a diagram providing a detailed illustration of the functional architecture of another exemplary implementation of the system of FIG. 3.

FIG. 5 shows a detailed illustration of another implementation of the system of FIG. 3. This illustration and the illustration provided in FIG. 2 shall be referred to below to explain a particular utilization of the multicast communication scheme and how such scheme may be modified in accordance with the system and method of the present invention. In particular, all RSCs 10 have access to a plurality of multicast channels 500 (i.e., addressed at locations M1 to Mi). These addresses 10 may be provided in memory or on the hard drive of one of RSCs 10, in a shared memory distributed between, or may be located on a storage device remote from RSCs 10. The multicast address can also be assigned by a multicast address dispersing computer. In addition, all RSCs 10 have access to a global index address Mx.

In general, a particular one of RSCs 10 may provide a multimedia stream at a particular multicast channel address (e.g., M1), and then announce to the global index address Mx that it has provided the multimedia stream on that particular address. As shall be explained in further detail below, the global multicast addresses are associated with local multicast addresses so that each RAS 40 can forward either the global broadcast provided in at least one of the multicast channels 500 (see FIG. 2) broadcast by one or more of RSCs 10, as well as a transmit the local broadcast that it generates.

At boot-up time, the clients C0-C9 (i.e, IMCs 50) receive the information associated with the content provided in one or more of the multicast channels 500 (preferably by checking a local index address lmx which is associated with the global index address Mx as shall be described in further detail below). In particular, by checking an address which is associated with the global index address Mx, the clients C0-C9 may determine which multimedia stream is currently being provided in the local channels that are associated, at least in part, with the multicast channels M1-Mi. Then, one or more of RASs 30 may generate the respective requests to receive one or more of the global multimedia streams (provided in the channels which may be associated with the multicast channels M1-Mi). It is also possible for the clients (i.e., IMCs 50) to receive the addresses of the updated multicast channels 500 from the source (i.e., RSC 10) in real-time or when desired. The requests are transmitted upstream to the routers (not shown) which are connected to the respective clients (i.e., IMCs 50).

Provided below is a detailed description of the exemplary components of the illustrative system and method according to the present invention described above, with reference to FIG. 5.

I. Radio/Television Station Client (RSC)/Primary Station

As indicated above, RSC 10 can be a computing device of any regular radio/television station/broadcaster that is capable of transmitting its regular programming on an Internet Protocol-based network. It should be understood that Radio Station Client (RSC) can also be a station client which transmits a television type broadcast over the communications network. When RSC 10 broadcasts its program over the communications network 20 (e.g., the Internet), such broadcast is transmitted to an Internet gateway (not shown in FIG. 5) (e.g., a router) located near the server's location. Each primary station of RSC 10 (e.g., PS1, PS2 . . . PSn as shown in FIG. 5) can preferably transmit its broadcast on an assigned unique multicast channel corresponding to a particular multicast address (e.g., M1, M2 . . . Mi), and the respective broadcasted content is provided to this address. As discussed above, the assigned multicast address, along with few other relevant parameters, are announced to a global multicast address (Mx).

II. Antenna Server(RAS)/Local Station

RASs 30 are generally distributed according to the population, the geographic area and/or some other topology. Each RAS 30 preferably offers two program tracks to a user of IMC 50—the global broadcast transmitted by RSC 10 and the local broadcast provided by RSC 30. In should be understood that RAS 30 can transmit/receive television broadcasts. Since numerous global broadcast can be provided on a number of multicast channels, RSC 30 preferably relays at least a subset of all transmitted programs in the global broadcast to IMC 50. The broadcast transmitted by RSC 10 is generally transmitted globally with gaps in the global broadcast so that the local advertisement and/or promotional content can be inserted in such gaps. The local broadcast may be local news segments provided by RAS 30. This scheme according to the present invention provides the user of IMC 50 with an ability to receive either the local broadcast or the global broadcast.

RAS 30 preferably includes a Management Server (MS) 200 and a channel database 220. The Management Server 200 creates and/or maintains the channel database 220, records the statistics regarding the number of IMCs 50 that are receiving a particular broadcast at a particular local multicast channel, provides control tools for maintaining and modifying configurable parameters, and manages the interface with other devices (e.g., a RTSP server and/or media database, etc.). For each RAS 30, the Management Server 200 monitors the global index address Mx, and receives the global multicast channels M1, M2 . . . Mi (which provide the audio and/or video streams) that are described by the global index address Mx.

These multicast channels are provided in an encrypted form to RAS 30. An exemplary scheme to decrypt the encrypted multicast channels at RAS 30 shall be described in further detail below. After decrypting one or more of the global multicast channels M1, M2 . . . Mi, the stream provided at the address of the decrypted multicast channel (e.g., the global channel M1) is rerouted to a particular local multicast channel (e.g., the local channel lm2) that is provided at a corresponding local address. In this manner, IMCs 50 can receive the decrypted stream which is provided at the global channel M1 to RAS 30. RAS 30 also maintains the directory services, and keeps track of the IMCs 50 that receive a particular broadcast (i.e., local and/or global). Hence, RAS 30 can provide pay-per-listen and/or pay-per-view channels, bill the subscriber using the IMCs 50 and manage them.

III. Advertisement/Media Arrangement (AMA)

As described above, RAS 30 may include AMA 40, or AMA 40 can be provided remotely from RAS 30. AMA 40 includes a Local Advertisement Server 210 (which can be an RTSP server). This Local Advertisement Server 210 is capable of playing local media on demand programs (e.g., songs and/or music videos), as well as inserting a local advertisement into the global broadcast during a commercial break thereof.

IV. Internet Multimedia Client (IMC):

IMC 50 can be a wired Internet Protocol (IP) device or a wireless IP device. For example, IMC 50 can be considered wired when it is connected on a LAN, and wireless when it is located remote from the LAN and communicating over a wireless communications link. IMC 50 is capable of executing application programs which monitor the local index multicast address lmx where data regarding the global or local program are provided. Conventional tools (e.g., NeVot, Vic, vat or any tool based on SAP/SDP standards) can be utilized by IMCs 50 to monitor the broadcasts and receive the multimedia (e.g., audio and video) streams from the local multicast channels lm1, lm2 . . . lmi. Using these tools, IMCs 50 may select any of the broadcasts (i.e., local or global) provided by RAS 30 by e.g., viewing the local multicast index address lmx on the displays of IMCs 50.

Once, IMC 50 selects a particular channel, it starts sending an RTCP signal and receives the audio and/or video stream over UDP/IP. The protocols described herein (e.g., RTPC, UDP/IP, etc.) are known in the art, some of which shall be described below in a greater detail. After receiving the RTCP signal, the Management Server 200 starts monitoring the global multicast address of the global multicast channel which provides the broadcast (e.g., the radio program) selected by IMC 50. When the broadcast at the selected channel is detected, RAS 30 directs it to the assigned address of the local multicast channels. The Management Server 200 continues to transmit the broadcast content, and only interrupts the broadcast when there are no more IMCs 50 that are receiving and/or requesting this broadcast.

Figure 6A:
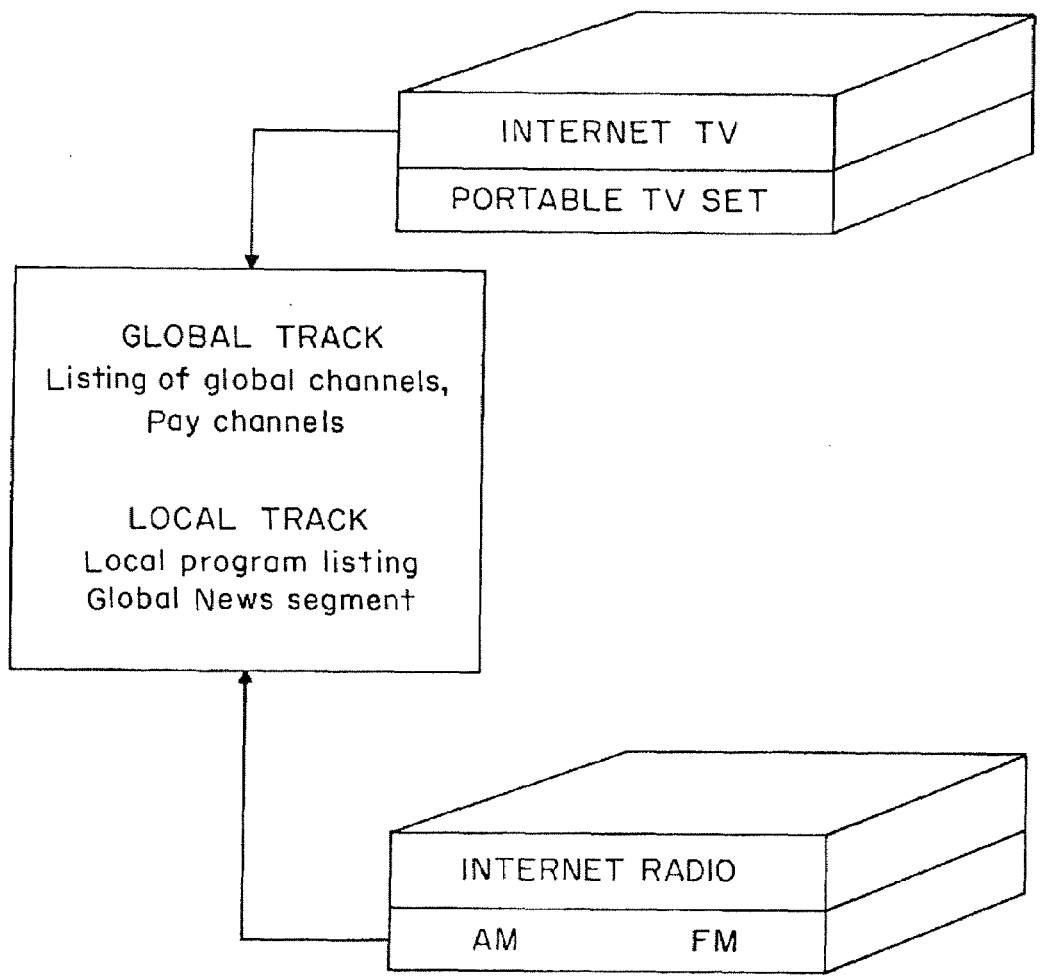
FIG. 6A is a functional block diagram showing an exemplary embodiment of the Internet-capable broadcast receiving devices according to the present invention.

As shown in FIG. 6A, IMC 50 can be a radio having an ability to toggle between AM/FM broadcasts and the Internet channels, and/or a television which can receive wireless and/or cable broadcasts, as well IP broadcasts. For example, it is possible to provide a wireless interface having UDP/IP multicast stack which can be connected to a conventional portable radio or a portable television, (or utilized independently). Thus, the connection of an conventional radio/television receiver to the Internet can be accomplished. As an example, the conventional radio/television receiver includes a tuner for AM/FM broadcasts and/or for the television broadcasts. In addition, this radio/television receiver may include a switch (e.g., a mechanical switch, an electrical switch, an automatic software switch, etc.) with which the radio/television receiver can be converted to an Internet-ready device. Based on the SDP parameters of the program being broadcasted, the tuner of the Internet-ready device would detect the broadcasts and possibly categorized them (e.g., News, Entertainment, etc.). Advantageously, the categories and the available broadcasts are presented on a display screen of such device so that the user can select which category/broadcast he or she would like to receive.

It is also possible to utilize a conventional speech generation/recognition system in connection with the Internet-ready-device. For example, the device would provide the available broadcasts/categories to the speech generation/recognition system which would then generate voice-type descriptions of the broadcasts/categories. Then, the user may vocalize his or her selection, and the speech generation/recognition system would determine the selection and provide the requested action.

B. Exemplary Protocols and Operation/Implementation

II. Protocols

Figure 6B:
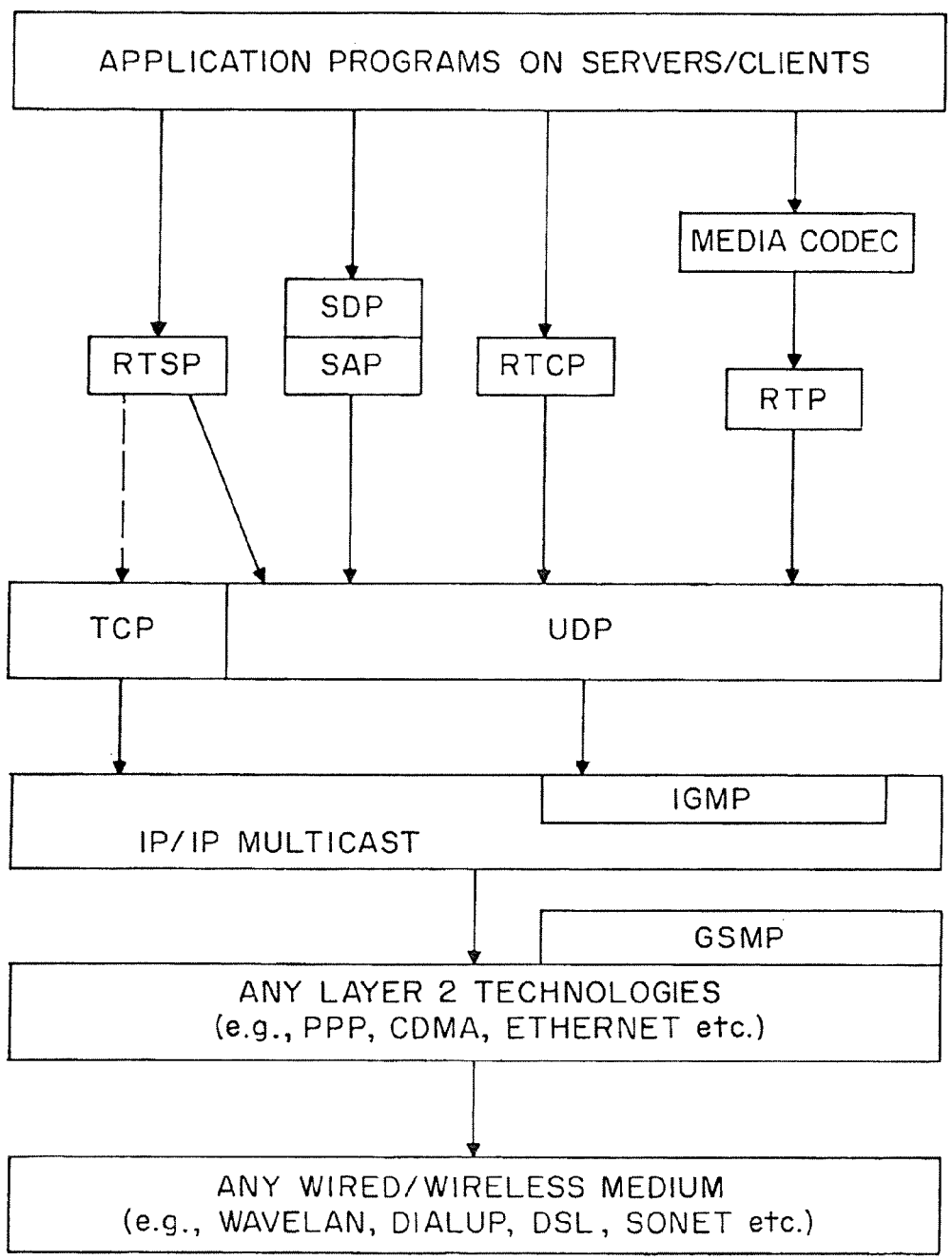
FIG. 6B is a functional block diagram showing an exemplary protocol stack, that can be used by the system and method of the present invention.

The system and method according to the present invention uses (and possibly modifies) the conventional protocols, i.e., SAP (Session Announcement Protocol), SDP (Session Description Protocol), RTSP (Real-Time Streaming Protocol), RTP (Real-time Transport Protocol), TCP, UDP, IP and IP Multicast. An exemplary protocol stack utilized by the exemplary embodiment of the system and method is shown in FIG. 6B. The network infrastructure can be wired and/or wireless. One exemplary implementation of this infrastructure can operate with LMS/MMD wireless links.

Provided below is a short description of the primary protocols that can be used by the exemplary embodiment of the system and method of the present invention.

SDP is a Session Description Protocol which is usable for multi-media sessions, and can be utilized as a format for a session description (generally does not incorporate a transport protocol). SDP is intended to be used for different transport protocols as appropriate, including SAP, SIP, RTSP, electronic mail using MIME extensions, and HTTP. SDP includes the session name and purpose, the time the session is alive, the content type (e.g., audio and/or video) comprising the session, information to enable reception of those content types (addresses, ports, formats etc.), the bandwidth to be used by the broadcast, and the contact information for the person responsible for session. SDP is widely used for the multicast sessions over the Internet. In order to assist in the advertisement of multicast sessions and to communicate relevant session setup information to prospective participants, a distributed session directory can be used. An instance of such a session directory periodically multicast packets containing a description of a multimedia session to a multicast address. These signals are subsequently received by potential participants, who can use the session description to start the tools required to participate in the session. Using this protocol, the sender can assign a particular bandwidth for a particular application (e.g., radio and/or television broadcast). In this manner, the more popular or bandwidth-intensive application (e.g., television news) would use more bandwidth than non-popular application/broadcast. Thus, a popularity-based spectrum management can be achieved.

SAP is an announcement protocol that distributes the session directory to the multicast conference sessions. An SDP datagram is part of the payload for SAP. SAP client which announces a conference session, periodically multicasts an announcement packet to a known multicast address and port. The appropriate address is determined by the scope mechanisms operating at the sites of the intended participants. IP multicast sessions can be either TTL-scoped or administratively scoped. Thus, an instance of the session directory may need to listen on multiple multicast addresses. The announcement contains a session description and optionally an authentication header. The session description may be encrypted. It is preferable to provide an authentication and integrity of the session announcements to ensure that only authorized parties modify session announcements, and to provide the facilities for announcing the securely encrypted sessions while providing the relevant proposed conferees with the means to decrypt the data streams.

RTSP is a client-server multimedia presentation control protocol which is used for an efficient delivery of streamed multimedia over IP networks. It utilizes the existing web infrastructure (e.g., inheriting authentication and PICS from HTTP). This application level protocol may provide the robust streaming multimedia in one-to-many applications via unicast and multicast communication arrangements, and may support the interoperability between the clients and the servers from different vendors. The process of streaming breaks media streams into many packets sized appropriately for the bandwidth available between the client and the server. When the client receives enough packets, the user software can be playing one packet, decompressing another, and receiving a third. The user can begin listening almost immediately without the necessity to download the entire media file. RTSP can control multiple data delivery sessions, and is capable of providing a way for selecting the delivery channels (such as UDP, TCP, IP Multicast) and delivery mechanisms based on RTP. RTSP can be used in conjunction with other protocols to set up and manage the reserved-bandwidth streaming sessions.

RTP is a thin protocol which provides support for applications with real-time properties which can be run over UDP. RTP provides a timing reconstruction, loss detection, security and content identification. RTP can be used, possibly without RTCP, in the unicast or multicast communication arrangements. In order to set up an RTP session, the application may define a particular pair of the destination transport addresses (e.g., one network address and a pair of ports for RTP and RTCP). In a multimedia session, each medium (e.g., audio, video, etc.) can be transported in a separate RTP session with a corresponding RTCP session reporting the reception quality.

RTCP may operate in conjunction with RTP. It provides support for the real-time conferencing of large groups on the Internet. RTCP control packets are periodically transmitted by each participant in an RTP session to all other participants. The feedback of the information to the application can be used to control the performance and for other diagnostic purposes. RTCP provides the following exemplary functions:

Feedback to sending application regarding the quality of the data distribution.

Identification of the RTP source.

RTCP transmission interval control.

Communication of the minimal session control information.

SIP has been adopted by the industry, in many cases, as the signaling protocol for the Internet conferencing and telephony. SIP is a client-server protocol which provides the mechanisms so that the end systems and the proxy servers can provide different required services for setting up a proper signaling scheme. SIP creates, modifies and terminates the associations between the Internet systems (e.g., conferences and point-to-point calls). SIP is a text-based protocol similar to HTTP and RTSP, in which the requests are issued by the client, and the responses are returned by the server. SIP is independent of the packet layer and only utilizes a datagram service, since it provides its own reliability mechanism. This "light-weight" protocol is typically used over UDP or TCP, and provides light-weight signaling. SIP supports the unicast and multicast communication schemes, as well as combinations of thereof. It can implement a variety of the conference-related services with a small set of handling primitives.

II. Exemplary Implementation Using the Protocols

The general implementation of an exemplary embodiment the system and method according to the present invention has been already described above. An exemplary implementation of the system and method utilizing the above-discussed protocols is as follows.

a. Channel Announcement

With reference to FIG. 5, according to the present invention, a particular RSC 10 may send its program live on a unique global multicast channel (e.g., M1) globally scoped and encrypted using RTP/UDP. Other RSCs 10 can also broadcast their programs on other global multicast channels. Indeed, the multicast channel address is different for each broadcast and/or for each RSC 10. These stations send their session announcement using a subset of SDP parameters to the global index multicast address Mx (which can be encrypted). This common global multicast address contains a list of the programs that are being broadcasted by RSCs 10 on the communication network 20. SDP or a variant thereof can be modified to provide IMCs 50 with additional details regarding the streaming being broadcasted.

b. Channel Management

Figure 7:
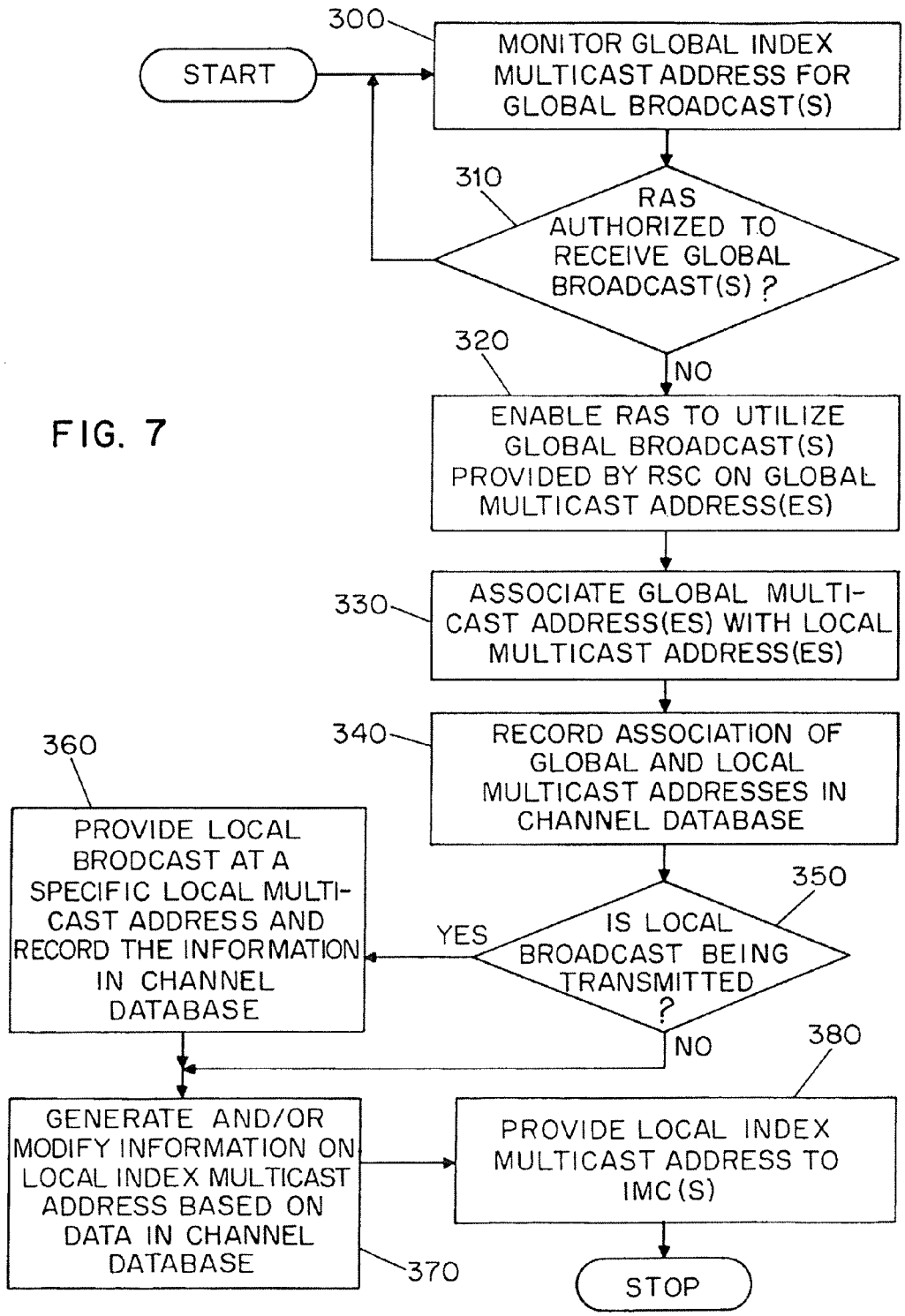
FIG. 7 is a flow diagram representing an exemplary embodiment of the method according to the present invention.

FIG. 7 shows a flow diagram representing an exemplary implementation of one embodiment of the method according to the present invention. In particular, each RAS 30 has a global encryption key which is used by the respective RAS 30 to monitor the global index multicast address (Mx) to obtain, e.g., the listing of the channels and the contents of the channels (step 300). Then, it is determined (e.g., using a decryption technique) if RAS 30 can receive some or all global broadcasts (step 310). If so, RAS 30 is then provided with an authorization to utilize the global broadcast on the global multicast channels M1 . . . Mi provided by RSC 10 (step 320). Either automatically or via the manual control, RAS 30 may decide to broadcast at least a part of the list to IMCs 50 that are associated with RAS 30. For this purpose, RAS 30 may create and/or utilize the channel database 220 which contains the list of the supported channels, each with their appropriate attributes, to associate the global broadcast channels with the local broadcast channels (step 330). The subset of channel descriptions announced by each RSC 10 provides sufficient data for generating and updating this database 220, which may be a subset of the list that is received from the global index multicast address Mx. In this manner, the association between the global and local multicast channels can be recorded in the channel database 220 (step 340).

Then, it is determined if RAS 30 is also transmitting a local broadcast (step 350). If so, RAS 30 transmits its local programs on a specific local multicast address lm_1, and records this information in the channel database 220 (step 360). If it is determined in step 350 that RAS 30 is not transmitting the local broadcast, the process proceeds to step 370, in which RAS 30 either generates and/or modifies the information in the channel database 220 regarding the broadcasts (e.g., local and/or global broadcasts) which are available for IMC 50. In step 380, RAS 30 sends the information provided on the local index multicast address lmx for the announcement using SAP to its IMCs 50. RAS 30 also sends the announcement regarding its own local programs to the same local index multicast address lmx using SAP. The announcement on the local index multicast address lmx is preferably not encrypted since the RAS 30 prefers all its clients (i.e., the associated IMCs 50) to see what is being broadcasted by it. In an alternative exemplary embodiment of the method of the present invention, RAS 30 maintains a pair of multicast addresses for each channel to maintain an association between the global multicast channel address (e.g., M1). Using the respective channels, RSC 10 provides its global program on the local multicast channel address (e.g., lm2) on which the broadcast being is transmitted to IMCs 50 by RAS 30 (i.e., steps 330 and 340).

Figure 8:
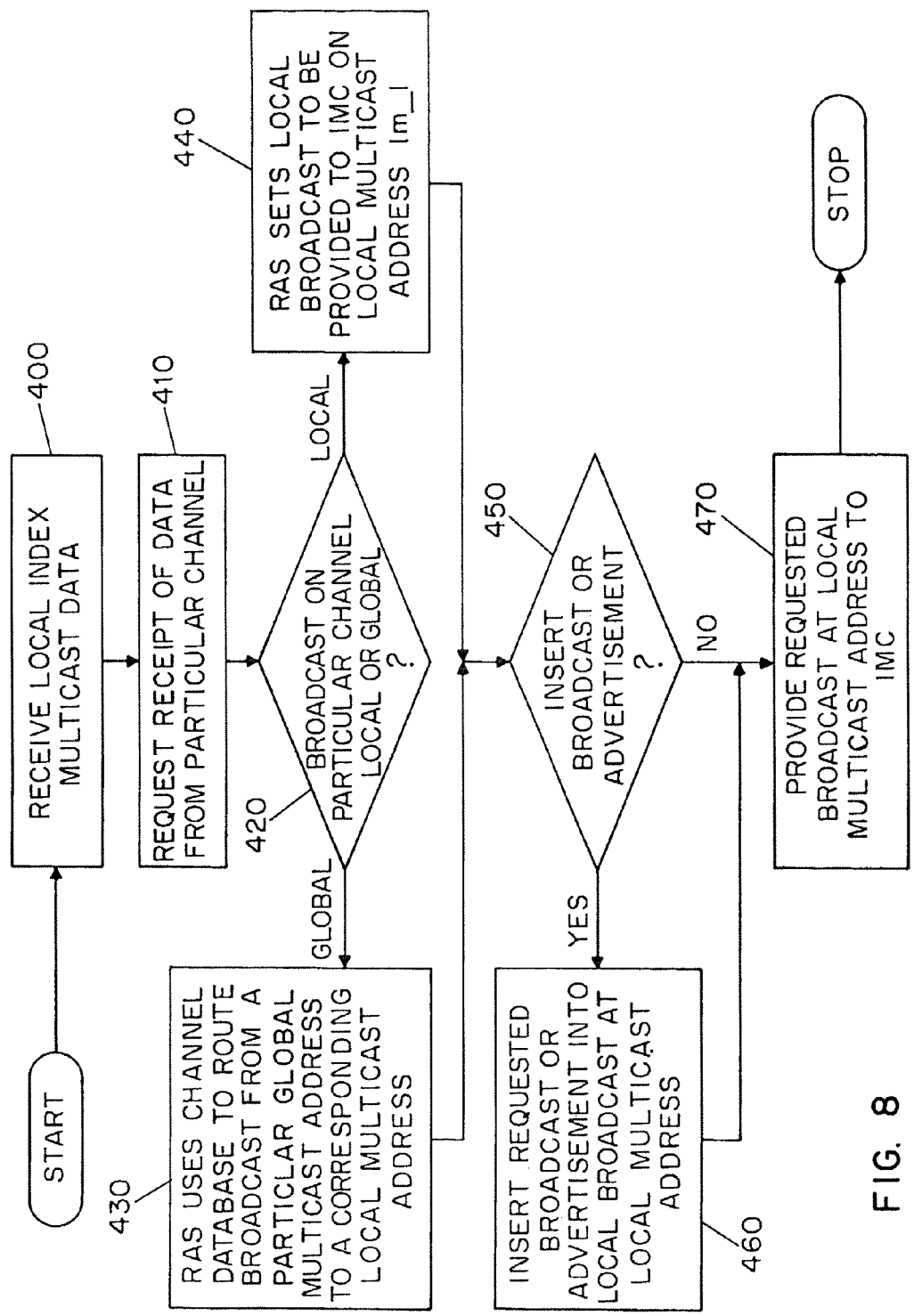
FIG. 8 is a flow diagram representing another exemplary embodiment of the method according to the present invention.

FIG. 8 shows a flow diagram representing yet another exemplary embodiment of the method according to the present invention which is executed when the information in the local index address lmx is provided to IMC 50. In particular, IMC 50 receives the information in this local index address lmx (step 400). Then, in step 410, IMC 50 may request to receive the broadcast from a particular local multicast channel (e.g., lm2). This broadcast can be encrypted or un-encrypted depending on the type of a payment model being utilized. Then, RAS 30 determines, based on the information regarding the local multicast address being requested by IMC 50, whether the broadcast on the particular channel is local or global (step 420). If it is determined that the requested broadcasted is a global broadcast (i.e., originated from RSC 10), RAS 30 uses the channel database 220 to route the global broadcast from the global multicast channel on which the requested broadcast is being transmitted to a corresponding local multicast address (step 430), and the process is directed to step 450. IMC 50 continues transmitting the RTCP packets to the Management Server 200 of RAS 30 as long as it receives the global broadcast on the particular local multicast channel. It should also be noted that when the Management Server 220 receives the global broadcast from RSC 10 on a specified multicast address using RTP/UDP, it also periodically exchanges RTCP signals with RSC 10.

If it is determined that the requested broadcast is a local broadcast (i.e., originated from RAS 30), RAS 30 provides the local broadcast to IMC 50 on the local multicast channel lm_1 which is assigned for local broadcasts (step 440). If RAS 30 indicates that another broadcast (either pre-recorded or live) or an advertisement should be inserted into the global or local broadcast (step 450), RAS 30 inserts (or plays) such broadcast and/or advertisement into the local multicast channel associated with the local multicast address of the global or local broadcasts address using, e.g., SETUP and PLAY commands (step 460). For example, the inserted broadcast may be either a live news broadcast or a prerecorded news broadcast. Then, RAS 30 provides the requested broadcast on the corresponding local multicast broadcast channel (e.g., lm2), either with or without the additional content being inserted into the broadcast (step 470). Thus, for that particular period, a local manager of RAS 30 may decide to join such specific global multicast group, this may be done when the local manager receives the RTP packets from RSC 10, and generates the RTP/RTCP packets for IMC 50 on the respective local multicast address.

c. Using the Protocols

To summarize, IMCs 50 may be Internet Multimedia Clients (e.g., personal computers and laptops utilizing wired and/or wireless interconnect, car radios/televisions having the IP interface) which monitor the local index multicast address lmx to determine what is available. Such monitoring can be performed using SAP- and/or SDP-based tools. As described in the SAP specification (which is incorporated herein by reference) and as known to those having ordinary skill in the art, RAS 30 can update the announcement information approximately every few minutes. Thus, the program executed at IMC 50 may wait for few minutes before seeing the most updated channel information. By using SAP, this lag is either substantially reduced, or even eliminated, by a caching scheme. For example, this caching scheme either executes the SAP receiver of IMC 50 in the background to continuously keep its cache current, or moves to a local SAP proxy at the startup time of IMC 50 and requests a cache download. In the latter case, RAS 30 essentially becomes the SAP proxy.

When IMC 50 makes a request to listen to one of the programs listed in the program listing (e.g., clicks on the channel), this IMC 50 sends the RTCP signal to the local station manager of RAS 30. If there is a broadcast (e.g., a data stream) already playing on this local multicast address provided pursuant to a previous request from other IMCs 50, then this particular IMC 50 starts receiving the audio and/or video stream using RTP/UDP. However, if this is the first request for such broadcast in this local domain, then RAS joins the multicast tree of the corresponding global multicast address to receive the broadcast from the corresponding RSC 10 which is transmitting the requested broadcast. RAS 30 can use a conventional application program (e.g., "mlisten") to determine if there is any member which is part of any particular multicast group that is currently transmitting broadcasts, and thus should be able to determine if the request is a first such request for a particular multicast group. "mlisten" is a conventional multicast application for monitoring the number of users joining a particular multicast group (e.g. receiving information from a particular multicast channel).

d. Local Advertisement Insertion

In accordance with exemplary embodiments of the system and method of the present invention, the insertion of advertisement content into the global or local broadcast transmitted to IMC 50 is now described below. The system is implemented such that RSC 10 knows the starting time and the duration of a commercial break prior to the transmission of the global broadcast, since it controls the time for such break. These commercial breaks can also be event driven. Along with the RTP packets, RSC 10 continues sending the RTCP packets to the global multicast address of the global multicast channel where RASs 30 are monitoring the streams of broadcasts. Using the RTCP report, RSC 10 provides the signal to RAS 30 which indicates the time and the duration of a break in the broadcast. The term "advertisement" as used herein includes not only the content directed to selling a product or service or to promote the goodwill of a commercial sponsor, but also to public service messages and announcements, station break announcements, promotions and/or other programming to be broadcasted.

Figure 9:
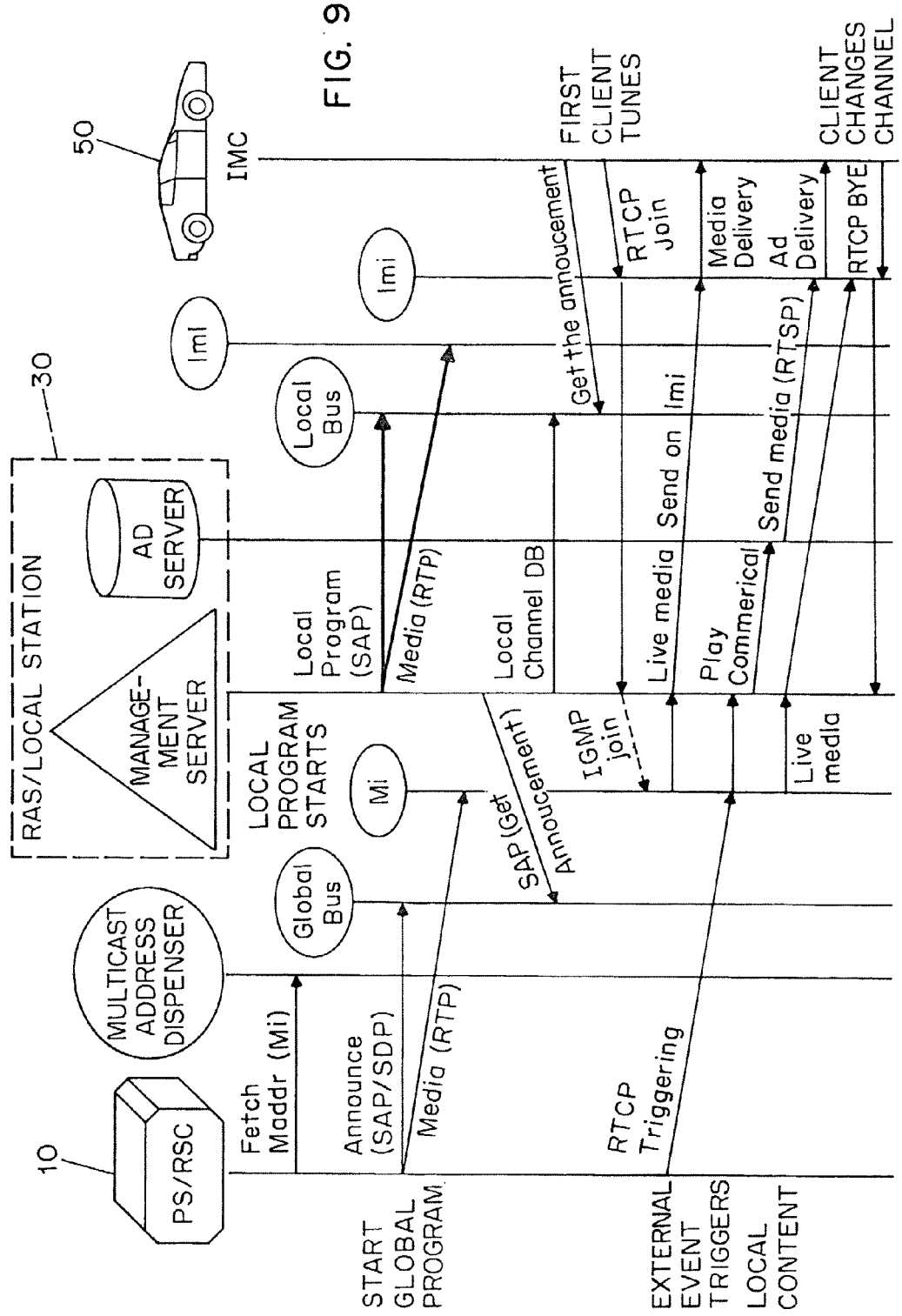
FIG. 9 is a schematic system-level functional diagram showing a detailed implementation of the system and method according to the present invention utilizing particular protocols.

Upon receiving such signal, the Management Server 200 of RAS 30 requests the local RTSP server 210 (which is part of AMA 40) to start playing the local advertisement from a storage medium to a specific local multicast address which is associated with the global multicast address at which RSC 10 transmits the global broadcast. RAS 30 uses a set of RTSP commands, such as SETUP, PLAY and STOP on AMA 40. During this time, the Management Server may stop forwarding the RTP stream from the global multicast channel to the associated local multicast channel. The local advertisement runs for a time determined by the Management Server 200 using the information received from the RTCP reports. At the end of the time for the commercial break, the Management Server 200 sends a STOP signal to the RTSP server 210 so that it stops playing on that particular multicast address. Then, the Management Server 200 resumes redirecting the audio and/or video streams from the global multicast address to the associated local scoped multicast address. Since the commercial break times for RASs 30 may overlap, it is possible that the RTSP server 210 could play several different local advertisements on the different local multicast addresses. An illustration of the exemplary implementation described above is shown in FIG. 9.

One implementation of the system and method for inserting the advertisements into the broadcasts is described in greater detail below. In particular, the system and method can use "InsertAd.java" commands to insert local advertisements. As soon as the broadcast appears on the global multicast channel, it starts an InsertAd thread which listens for RTCP packets generated by RSC 10 (e.g., the RTCP port is one greater than the RTP port). The RTCP packets from RSC indicate the number of seconds remaining until the start of the advertisement, as well as the length thereof. InsertAd command inserts a local advertisement by switching the channel mode to "advertisement". When the global commercial is finished, InsertAd switches the channel mode back to "redirect". The list of the local advertisement files is specified inside a list file which are inserted using, e.g., a Round Robin scheduling scheme.

At startup, RSC 10 initiates RsSendRTCP thread to notify RAS 30 of the commercial breaks. The thread sends the RTCP packets so that RAS 30 can insert local advertisement. The RTCP packets indicate the number of seconds remaining to the start of the advertisement, as well as the length of the advertisement. The start times of the advertisement are read in the following format (e.g., one record per line):

day/hour/minute/second/duration;

day is 1 through 7 which stands for Sunday through Saturday; hour is 0 through 23; minute is 0 through 59; second is 0 through 59; and duration is specified in seconds.

Since the RTCP packets are transmitted over UDP, there may be a possibility of a packet loss or an incorrect order. To address this potential problem, the RTCP packets are re-transmitted (e.g., one packet 4 seconds prior to the advertisement, next one −3 seconds, next one −2 seconds, etc. with the corresponding value in the field which indicates the time remaining until the start of the commercial). In addition, to allow RAS 30 to distinguish between the re-transmissions and advertisements, the RTCP packets have a particular sequence number. All re-transmissions have the same sequence number. Each advertisement has a sequence number one greater than the previous sequence number.

e. User Interface for Itemized Content

It is possible to utilize and/or modify a conventional directory structure/user interface referred to as "sdr" in implementing the embodiments of the system and method of the present invention. This directory structure/user interface can be used as a tuning mechanism for the wireless IP radios and/or IP television, and may be touch-tone based, voice activated, etc. This "sdr" structure/program (created by ISI, Meriana del Ray, Calif.) can be modified or extended to make it more customized and searchable for searching purposes. For example, "sdr" can be modified to categorize the content of the streaming media according to the type of program being broadcasted (e.g., "game show", "news", etc.) In addition, it is possible to utilize a voice activated-type "sdr" according to the content type, as well as to provide a menu for a particular locality. Also, with a touch of a button or by pronouncing a particular word (e.g., "News"), sdr would provide a visual menu or a voice menu to indicate which channels are available to that particular locality. With another touch tone or voice activation, sdr may provide IMC 50 with access to the broadcast from the local multicast channel. Other features need not be further discussed, since they would be clearly understood to one having ordinary skill in the art.

f. Payment Model

There are numerous payment models that can be supported by the system and method according to the present invention. For example, RAS 30 may collect the fees from the local advertisement sponsors for broadcasting their advertisements during the commercial breaks while relaying the global or local station broadcasts. In addition, RAS 30 may also relay some pay-per-listen and/or pay-per-view programs. In this case, RAS 30 pays the global station (i.e., RSC 10) a fee which depends on how many listeners/viewers are listening to or viewing a particular program. The number of listeners/viewers can be determined from the RTCP reports that are generated from IMCs 50. Every RAS 30 can also broadcast its local program to IMCs 50 with the segments of the news or some other premium programs relayed from RSCs 10.

A different type of the pricing model can also be provided to reflect the process of determining when and on which channels the advertisers should place their advertisements in order to maximize their return on investment. Priorities can be assigned to certain advertisements so as to enable the advertisers to compete for a higher time slot or timing of the advertisement (e.g., the highest paying company would get the slot during the Super Bowl by using a contention algorithm). It may also be possible to implement the exemplary payment schemes, e.g., public financing, advertising and on-air solicitations for donations. Hybrid models (e.g., the paying customers are not required to view or listen to commercial or receive solicitations for donations) are also feasible. Furthermore, another embodiment of the payment model can be associated with the security model described below.

g. Security

It is possible to provide at least four levels of encryption for the system and method according to the present invention (e.g., a global announcement encryption, a global multicast stream encryption, a local audit encryption and a user authentication).

Utilizing the global announcement encryption, it is possible to separate the global announcements from the local announcements. IMCs 50 should not be able to gain access to the global announcements, and would only be able to view the local announcements. With the global encryption key during the announcement (by RSCs 10), IMCs 50 would not be allowed to find out about available the global channels, and thus such scheme provides a control over to RSC 10 to announce only a subset of these channels to IMCs 50 via RASs 30. However, if some stations do not want to encrypt their contents and session announcements at all, this security model should effectively prevent IMCs 50, as well as the nonpaying RASs 30, from receiving the broadcast from those designated stations. Thus, each RSC 10 should maintain a secret key, and encrypt all outgoing content so that only a ciphertext stream is transmitted. In particular, the concept is to generate a symmetric encryption key at RSC 10, and securely distribute this key to a particular RAS 30 upon payment of the required fee. There are many ways this key can be distributed to the local stations, as is known to those having ordinary skill in the art.

The global multicast stream encryption can be extended to RAS 30 as a second level hierarchy. Some of the pay-per-listen and/or pay-per-view programs can be announced to the local multi-cast addresses in any domain using the encryption key so that an appropriate fee collection procedure can be established for the IMCs 50. Any type of encryption can be applied to the audit data of RAS 30, so as to preserve the sensitive information such as the secret keys of RSCs 10, the information for the pay-per-listen and/or pay-per-view channels, the user accounts, and the payment data. The advertising entities can be authenticated so that unauthorized companies could not gain access to AMA 40.

In practice, each RAS 30 generates its own Public Key/Private Key pair. Each RSC 10 generates an SEK key, and begins transmitting the encrypted audio and/or video content. This SEK key should be distributed to the participating RASs 30 in a secure way so that other RASs 30 (which did not pay) cannot obtain this key. As such, the Public Key technology is employed for this purpose. RAS 30 submits the Public Key to RSC 10 along with its payment. Then, RAS 30 receives an Integer ID from RSC 10 which is later used to index the SEK distribution list. RSC 10 collects the Public Keys from RAS 30 and adds these keys to its SEK distribution list upon their payment.

h. Logging Mechanism

One of the purposes of providing a logging mechanism for the system and method of the present inventions is to provide a process for the advertisers to determine when and on which channels to place their advertisements so as to maximize their returns on investment. RTCP is well suited for allowing RAS 30 to collect user-specific and channel-specific listening information. In one embodiment, RAS 30 constantly monitors the number of users receiving the broadcast on each channel, as well as the type of content being transmitted (i.e., the advertisements as opposed to the real content). This is especially advantageous for payment purposes by the advertiser to the local station when the users join or leave the local multicast group at the time when the advertisement starts/stops playing. When RAS 30 detects an "audience change" (i.e., a change in the number of listeners or the type of content), it encapsulates this information into a particular structure, and passes it to the separate logging thread for storing into the log files. The logging thread in turn, buffers this information and periodically writes out the contents of the buffer, in a binary format, to the log files (using a java serialization).

The above-described features—i.e., separate logging thread, output buffering, and binary (as opposed to text) logs—enable a quick output to avoid an interference with the quality of the audio and/or video transmission at runtime. In addition, these features allow for a good scalability as the number of the receivers of the broadcasts increase. A report generation tool can also be used to inspect the log files, and generate the statistics in a format that can be presented to the user. Such tool may support various commands, such as line options that control the way the tool interprets the log and presents its contents to the user.

C. Non-Multicast Enabled Network

The multicasting environment can be implemented for all segments within the system and method of the present invention. Although it may be simpler to implement the multicast communication in the Intranet or within an autonomous system (e.g., a separate domain), in the past the multicast support between the autonomous systems has not been readily available. To extend the above-described functionality to a network where the multicast communication is not supported, it may be preferable to provide another embodiment of the a system and method according to the present invention which is based on the user level or the network level application level.

I. Multicast Tunneling—Network Layer Solution

If there is a lack of the multicast connectivity between some portions of the network, the multicast connectivity can still be used by establishing a multicast tunnel between two different networks using the edge routers. In order to establish the multicast tunnel, it is preferable to provide at least one server running a multicast routing daemon in each such network. However, since this approach is a network layer solution, it may also be preferable if some of the hosts would be running the multicast routing daemon. This approach may also assume that there is a mutual understanding (i.e., interconnectivity) between several connectivity providers.

II. UDP Servers—User Level Solution

Figure 10:
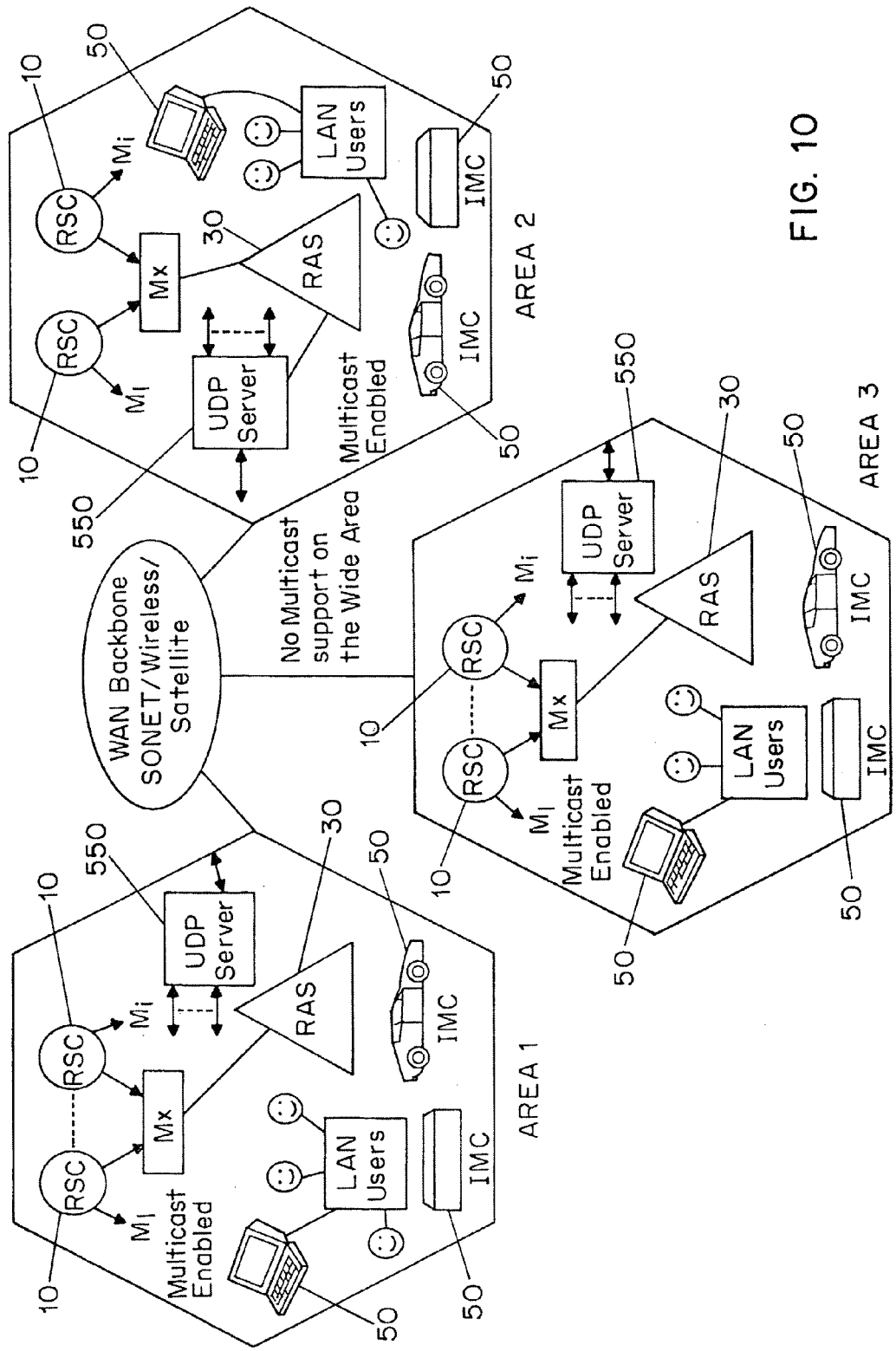
FIG. 10 is a schematic system-level functional diagram showing an exemplary scheme in which multicast systems are interconnected via a non-multicast network.

It may be easier to implement the multicast communication within the Intranet. Since the multicast communication is not yet widely deployed over the wide area network (i.e., some of the intermediate routers may not support the multicast communication), the multicast connectivity between portions of these autonomous systems may not currently exist. FIG. 10 shows an exemplary configuration where there is no multicast connectivity in the wide area network, but the multicast communication is enabled within the local area. Thus, there may be islands of multicast enabled networks, but there may not be any multicast connectivity between the islands. In this exemplary configuration, a UDP Server 550 is provided. This UDP Server 550 is co-located with RAS 30. It is also possible that its functionality is provided in the Management Server 200. This UDP server 550 can use a modified version of "rtptrans" which allows a conversion of the audio and/or video stream from the multicast network type to the unicast network type, and vice-versa. "rtptrans" is a conventional RTP translator application which copies RTP packets from any number of unicast and multicast addresses. Alternatively these servers can use "UDP Multicast Tunneling Protocol" (UMTP) which can set up a connection between the multicast enabled islands by tunneling multicast UDP datagrams inside unicast UDP datagrams.

In particular, whenever any radio station wants to announce its program to the Internet, or if any system wants to broadcast content to the Internet, these devices register with the nearest antenna server. This can be done as described above, where each broadcaster will send its announcement on a specific multicast address in the local domain, and RAS 30 will receive the announcement through SAP. Each RAS 30 is responsible for maintaining a database of the program profile of the set of radio stations announcing in the same domain. If there is no multicast connectivity between antenna servers over the wide area network, then RASs 30 would update each other's program schedules which can be categorized according to, e.g., the News type. Thus, at any point in time, each RAS 30 will have the program schedule of all RSCs 10 broadcasting globally, in addition to its own local program if RAS 30 is broadcasting the local program.

III. Utilization of UDP Multicast Tunneling Protocol (UMTP)

In order to extend this multicast connectivity to all the autonomous systems, LTDP servers that execute the convention UDP Multicast Tunneling Protocol can be implemented for a use with the system and method according to the present invention. For example, the UDP Multicast Tunneling Protocol establishes a connection between two end-UDP servers by tunneling the multicast UDP datagrams of the respective domain inside unicast UDP datagrams. Each UDP server is located within the autonomous system and that autonomous system is multicast capable. In this case, both the end points of the tunnel act as masters. Whenever a tunnel endpoint—whether a master or slave—receives a multicast UDP datagram addressed to a, e.g., group, port, etc., that is currently being tunneled, it encapsulates this datagram, and sends it as a unicast datagram to the other end of the tunnel. Conversely, whenever a tunnel end-point receives, over the tunnel, an encapsulated multicast datagram for a group or port of interest, it decapsulates it and resends it as the multicast datagram.

Each UDP server in an autonomous domain listens to the local common multicast address to find out the announcement within its domain, and passes it to the other UDP servers in other domain within an encapsulation. Another UDP server, after receiving the local multicast address, decapsulates and announces it on the local multicast address in the other domain. These UDP servers keep listening to each other periodically to update the announcement status. Thus, at any particular point in time, each client knows the program status of several programs that are playing within various domain. If a client prefers to listen to a particular program playing in a different domain, it makes a request on the local common announcement bus. The local UDP server receives the request, and passes this request to the corresponding UDP server in the proper domain. The remote UDP server sends the encapsulated stream on a unicast address, and the local UDP server sends it on the appropriate multicast address in the local domain. It is preferable if there is no overlapping of the multicast addresses with those provided in a different zone (e.g., a zone provided remote from the zone which provide the information on the multicast channel).

IV. RTP Trans

It is also possible to provide an RTPTrans server which converts the multicast stream to the unicast stream, and vice versa. A dedicated RTPTrans server can be provided in each area. Alternatively, the RTPTrans server can be a part of RAS 30. For example, the RSCs 10 in the local area transmit programs to the specified multicast addresses, and send their announcements to the common multicast address. The local RTPTrans server listens to these announcements, and send them to other RTPTrans servers located in different areas, where the announcements are transmitted to the common multicast announcement address in that specific area. Thus, when RAS 30 listens to the common multicast address using SAP, it can obtain the program listing of RSCs 10 in other areas, in addition to the listing in its own area. The RTPtrans server receives the unicast audio and/or video stream from each RSC 10 via other RTPtrans server, and multicasts it on a specific multicast address corresponding to the remote radio station.

D. Mobility Management

Another embodiment of the system and method according to the present invention provides a Mobility Management (MM) technique. This technique is especially preferable when IMCs 50 are mobile and wireless. Thus, e.g., area 1 may be covered by one RAS 30 provided one subnet, and area 2 may be covered by a second RAS 30 provided on another subnet. As the mobile and wireless IMC 50 moves from area 1 to area 2, it is essential for the mobile IMC 50 to continue receiving (i.e., without significant interruptions) the broadcast it was receiving from RAS 30 covering area 1. As shall be described in further detail below, one way to accomplish such uninterrupted broadcast is to imitate the streaming of the broadcast that the mobile IMC 50 has been receiving in area 1 into area 2. RAS 30 in area 2 should have adequate information about the mobile IMC 50 traveling into area 2 so that it can now begin streaming with virtually no perceived discontinuity in the broadcast to the mobile IMC 50. Provided below is a description of possible approaches to address the triggering of the multicast streaming in the wireless environment when the mobile IMC 50 moves from one subnet to another.

Figure 11A:
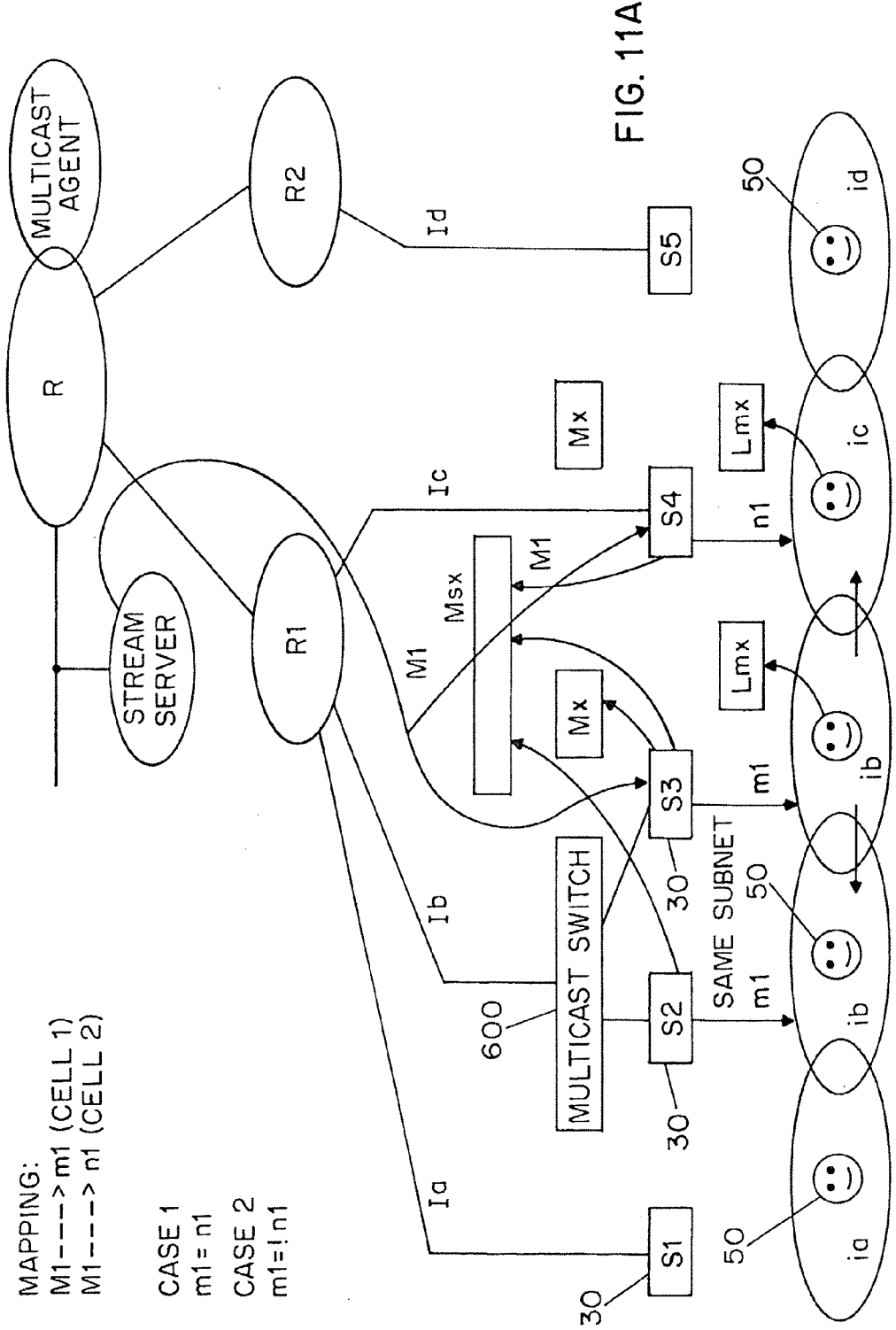
FIG. 11A is a functional diagram illustrating one embodiment of the system and method of the present invention for mobile clients.
Figure 11B:
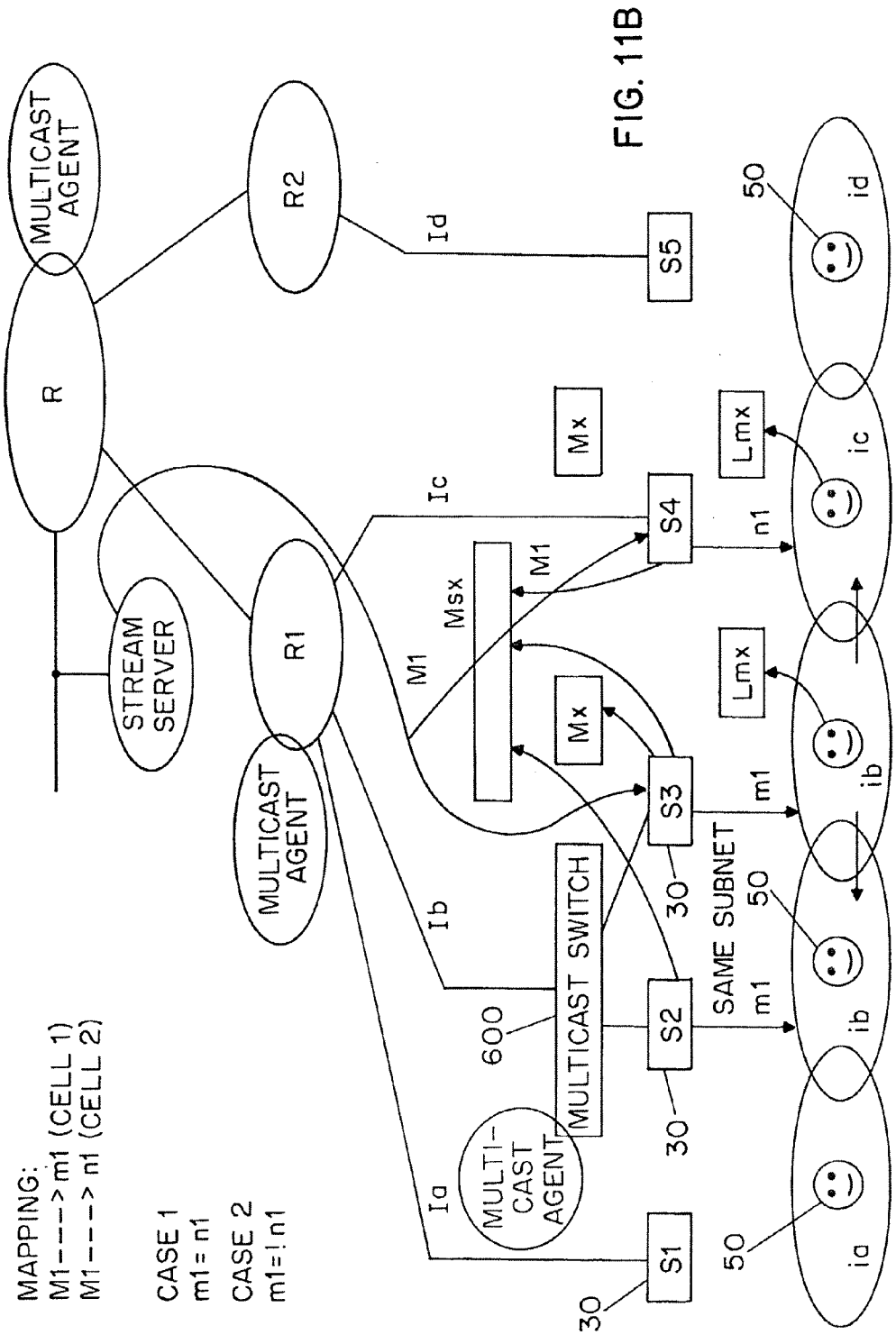
FIG. 11B is a functional diagram illustrating another embodiment of the system and method of the present invention for the mobile clients.

As described above, each RAS 30 may have two interfaces having respective addresses, one can be a global address and other maybe a local address. It is also possible to utilize one interface for both address configurations. As shown in FIGS. 11A and 11B, symbols 1*a*, 1*b*, 1*c* represent globally known subnets (e.g., globally addressable subnets) connected to one of the interfaces of respective RAS 30, while symbols ia, ib, ic represent the local subnets (or cells) connected to the secondary interfaces of RAS 30, and could be local to that particular area.

In operation, RAS 30 receives the multicast stream through its global interface and redirects it out through the local interface for IMC 50 in each cell. In the exemplary implementation shown in FIGS. 11A and 11B, symbols S1, S2 . . . S5 represent servers (or RASs 30) which are connected to upstream routers. Each server (with the exception of S2 and S3 which are connected to the same subnet via a multicast switch) is connected to a different subnet, and to a separate interface. Each server is assigned to one particular cellular region, which can be a part of a private subnet dedicated for the local user. The base stations are not shown in FIGS. 11A and 11B for the sake of simplicity of the depiction. These base stations can be IP based. It is also possible for the servers to behave as the base stations on one of its local interfaces (e.g. having dual interfaces). It is also possible to connect the second interface of the server to a non-IP based base station (e.g., a layer-2 base station), which would perform the handoff. In the illustrated implementation, the servers S2 and S3 are connected to a multicast switch, which then becomes a part of the same subnet that can manage the traffic using GSMP. GSMP is a General Switch Management Protocol which can be used in multicast transmissions at a switch level. Using GSMP, is possible to save the bandwidth of an adjacent cell if both cells are part of the same subnet. Different exemplary schemes to effectuate the handoff of the broadcast when the mobile IMC 50 moves from area 1 to area 2 (i.e., from subnet S3 to subnet S4) shall be described in further detail below.

I. Post-Registration

The post-registration approach is the easiest approach. However, it may take a long time for the same multicast stream to be directed in the new cell. In an exemplary scenario, the mobile IMC 50 move to a new cell (i.e. from cell ib to cell ic), obtains the new IP address if it is moving to a new subnet, and then sends the join query via RTCP or IGMP scheme. In this case, there may still be a latency during hand-off. This latency can be avoided by other schemes described below.

Popularity based spectrum management to address the limits of spectrum, e.g., a control mechanism to manage an audio/video stream based on a popularity of the program.

In an implementation of an exemplary embodiment of the system and method according to the present invention, the mobile IMC 50 moves to an adjacent cell (i.e., from cell ib to ic), obtains a new IP address via a multicast address dispenser server if it is moving to a new subnet, and sends a "join" message via RTCP or IGMP scheme. After the handover, the mobile IMC 50 would continue to receive the multicast streaming content in the new subnet if there are other active participants in that adjacent cell receiving the content which the mobile IMC 50 wants to receive. If there is no participants which receive a particular streaming content in the adjacent subnet into which the mobile IMC 50 moves into, then the mobile IMC 50 joins the group by itself after receiving the query from the "first-hop" router (e.g., the router to which the mobile IMC 50 is directly connected to).

It takes some time for the mobile IMC 50 to configure itself after the move, and then join the group. For example, the mobile IMC 50 may wait for 70-75 seconds to receive the multicast traffic it was previously receiving after a handover. It is also possible to use a discovery agent to discover that the mobile IMC 50 has moved to another subnet (i.e., the mobile IMC 50 received a new address). This determination may triggers the above-described joining scenario.

Advantageously, the above-described handover timing can be reduced by exploiting a fast reconfiguration and join time using RTCP (via application layer triggering). For example, if the adjacent cell is not a new subnet, then the mobile IMC 50 does not need to be reconfigured. Indeed, the mobile IMC 50 retains its IP address, and the triggering procedure can still be activated using RTCP by utilizing a variation of GSMP. Otherwise, the streaming content would already be flowing in the adjacent cell via the multicast communication technique.

II. Pre-Registration

Each station (e.g., the servers S1, S2 . . . S5) can have multiple neighboring stations (i.e., also servers). For each of these station being shared with another station, it is preferable to issue a multicast announcement (e.g., a multicast address), where each station can determine the program subscribed to, e.g., the group address used by the mobile IMC 50. Just before IMC 50 leaves (or decides to leave) the current cell (a determination which could be based on the threshold value of the received signal), this IMC 50 sends an RTCP message to the local server. The local server then announces this RTCP message to the sharing multicast addresses, where the neighboring stations would be listening to in the global space. The neighboring stations (e.g., servers) connect to the multicast address, and verify it with the information in their own database to determine if this stream has already been transmitted (e.g., if the particular group has already been subscribed to). If another client have been listening to the same stream, then nothing is done. If the broadcast is not being transmitted, then RAS 30 sends an IGMP message to the upstream router, and passes the stream to the local cells using a local multicast address, even before the mobile IMC 50 moves to the new cell. Thus, a soft hand-off is emulated for the associated stream. As soon as the mobile IMC 50 moves to the next cell, it can still receive the same stream without any interruption. The mobile IMC

50 sends an RTCP BYE message to the server as it move away from the previous server.

III. Pre-Registration with Multicast Agent

In this scheme, a multicast agent is utilized to take care of the multicast stream. The multicast agent can be provided within each router, which sends these streams to the respective global multicast addresses (e.g., for the area where these clients are trying to move in) in each subnet for a specific period of time, as determined by a timer associated with the subnet. Thus, each neighboring server receives the stream irrespective of whether the mobile IMC 50 is moving into that cell or not. As soon as the mobile IMC 50 moves into the new cell, it sends an RTCP signal to alert that the mobile IMC 50 has moved in, thus the timer does not need to be triggered.

IV. During Registration

In another scheme according to the present invention, this information can be passed on, as a part of a registration method. When the mobile IMC 50 moves in and attempts to acquire the address in the local subnet, it can send the request for that stream in its DHCP option regarding the address it has been listening to. However, in that case, the server may also be a registration server. Thus, at the time of obtaining the IP address from the DHCP server, the mobile IMC 50 can send the local multicast address to the server, and depending on whether the server is already a part of the multicast tree, it would ignore this request or re-join the tree.

V. Proxy Registration

Another scheme can deploy a proxy agent in each subnet. These proxy agents join the upstream multicast tree on behalf of the servers, even before the mobile IMC 50 moves into the cell. The neighboring proxy server would then listen to a common multicast address to determine the impending host's subscribed multicast address.

The foregoing describes exemplary embodiments of the present invention. Various modifications and alterations to the described embodiments will be apparent to those skilled in the art in view of the teachings herein. For example, the system and method according to the present invention can also be used for either wired or wireless teleconferencing over the Internet using at least in part the multicast communication technique. It will thus be appreciated that those skilled in the art will be able to devise numerous systems and methods which, although not explicitly shown or described herein, embody the principles of the present invention, and are thus within the spirit and scope of the present invention.

What is claimed is:

1. A method for providing a broadcast of content to one or more receivers via a communication network, comprising the steps of:

a) receiving the broadcast on at least one global multicast channel;

b) associating at least one local multicast channel with the at least one global multicast channel;

c) receiving a request signal from the receiver to receive the broadcast;

d) connecting the receiver to the at least one local multicast channel;

e) routing the broadcast from the at least one global multicast channel to the at least one local multicast channel to provide the broadcast to the receiver;

wherein the at least one local multicast channel comprises an IP address;

f) inserting the broadcast into the at least one global multicast channel;

g) transmitting the broadcast at the at least one global multicast channel from a global server to a local server;

wherein the at least one global multicast channel is a plurality of global multicast channels, and the at least one local multicast channel is a plurality of local multicast channels;

wherein the broadcast is inserted into a first global channel of the global multicast channels;

wherein the first global channel is associated with a first local channel of the local multicast channels;

wherein the receiver receives the broadcast from the first global channel on the first local channel;

wherein the broadcast is inserted into the first global channel by the global server;

wherein the global multicast channels are received by the local server;

h) at the global server, inserting a further broadcast of content into a second global channel of the global multicast channels;

i) receiving a request from the receiver to receive the further broadcast from the local server;

j) if the second global channel is not available to the local server, obtaining access for the local server to the second global channel;

k) after step (i), associating the second global channel with a second local channel of the local multicast channels; and l) providing the further broadcast to the receiver by connecting the receiver to the second local channel and routing the further broadcast from the second global channel to the second local channel.

2. A method for providing and maintaining a real-time broadcast to a wireless receiver on a communications network, comprising the steps of:

a) providing the real-time broadcast into the receiver in a first subnet using a multicast communication;

b) receiving, from the wireless receiver prior to leaving the first subnet, a request to receive the real-time broadcast in a second subnet, such that the second subnet receives the real-time broadcast after the request, so as to move the real-time broadcast from the first subnet to the second subnet;

c) after receiving the request from the wireless receiver, providing the real-time broadcast to the wireless receiver in the second subnet using the multicast communication; and d) stopping the transmission of the real-time broadcast in the first subnet after receiving the request from the receiver.

3. The method according to claim 2, wherein the wireless receiver includes an Internet Protocol (IP) interface which enables the receiver to receive the real-time broadcast via an IP-type multicast communication.

4. The method according to claim 2, wherein the real-time broadcast is received on at least one global multicast channel, and further comprising the steps of:

e) associating at least one local multicast channel with the at least one global multicast channel; and f) establishing communication to the wireless receiver over the at least one local multicast channel, and wherein the real-time broadcast is provided to the wireless receiver by routing the real-time broadcast from the at least one global multicast channel to the at least one local multicast channel.

5. The method according to claim 2, wherein normal content of the real-time broadcast has at least one break at a respective time and for a respective duration, and further comprising the steps of:

e) inserting respective predefined content into the real-time broadcast during the at least one break in the normal content; and f) providing the real-time broadcast to the wireless receiver after the respective predefined content is inserted into the real-time broadcast during the at least one break in the normal content.

6. A receiver, comprising:

a tuner receiving at least one of a radio broadcast and a television broadcast;

an Internet Protocol-type communication device configured to receive a real-time Internet Protocol broadcast via a multicast communication;

a switching device switchably coupled between the tuner and the Internet Protocol-type communication device; and the tuner presenting categorized broadcasts to a user such that the user can select the broadcast to receive, wherein the switching device is switchable between a first state and a second state, the first state enabling the tuner to receive broadcast signals, the second state enabling the Internet Protocol-type communication device to receive Internet Protocol type data using the multicast communication, wherein the receiver is wireless, and the Internet Protocol-type communication device receives the real-time broadcast in a first subnet using the multicast communication, wherein, prior to the wireless receiver moving from the first subnet to a second subnet, the Internet Protocol-type communication device transmits a request to receive the real-time broadcast in the second subnet, wherein the second subnet receives the real-time broadcast after the request, and wherein, after transmitting the request, the Internet Protocol-type communication device receives the real-time broadcast in the second subnet by utilizing the multicast communication.

7. A method for providing and maintaining a real-time broadcast to a wireless receiver on a communications network, comprising the steps of:

a) providing the real-time broadcast into the receiver in a first subnet using a multicast communication;

b) receiving, from the wireless receiver, a request to receive the real-time broadcast in a second subnet while configuring an address in said second subnet, such that the second subnet receives the real-time broadcast after the request, so as to move the real-time broadcast from the first subnet to the second subnet;

c) after receiving the request from the wireless receiver, providing the real-time broadcast to the wireless receiver in the second subnet using the multicast communication; and d) stopping the transmission of the real-time broadcast in the first subnet after receiving the request from the receiver.

8. The method according to claim 7, wherein the wireless receiver includes an Internet Protocol (IP) interface which enables the receiver to receive the real-time broadcast via an IP-type multicast communication.

9. The method according to claim 7, wherein the real-time broadcast is received on at least one global multicast channel, and further comprising the steps of:

e) associating at least one local multicast channel with the at least one global multicast channel; and f) establishing communication to the wireless receiver over the at least one local multicast channel, and wherein the real-time broadcast is provided to the wireless receiver by routing the real-time broadcast from the at least one global multicast channel to the at least one local multicast channel.

10. The method according to claim 7, wherein normal content of the real-time broadcast has at least one break at a respective time and for a respective duration, and further comprising the steps of:

e) inserting respective predefined content into the real-time broadcast during the at least one break in the normal content; and f) providing the real-time broadcast to the wireless receiver after the respective predefined content is inserted into the real-time broadcast during the at least one break in the normal content.

* * * * *

UNITED STATES PATENT AND TRADEMARK OFFICE
CERTIFICATE OF CORRECTION

| | |
|---|---|
| PATENT NO. | : 7,296,091 B1 |
| APPLICATION NO. | : 09/596864 |
| DATED | : November 13, 2007 |
| INVENTOR(S) | : Ashutosh Dutta, Henning Schulzrinne and Yechiam Yemini |

It is certified that error appears in the above-identified patent and that said Letters Patent is hereby corrected as shown below:

ON THE TITLE PAGE: please insert
-- Related U.S. Application Data
Item (60): Provisional application No. 60/139,933, filed June 18, 1999. --

At column 1, line 37: "Jul. 20, 1999 and having 7,406 bytes; LAS java, created Jun."
should read -- Jul. 20, 1999 and having 7,406 bytes; LAS.java, created Jun. --

At column 7, line 51: "plary embodiment includes four functional components, I.e.,"
should read -- plary embodiment includes four functional components, i.e., --

At column 8, line 60: "more of RSCs 10, as well as a transmit the local broadcast"
should read -- more of RSCs 10, as well as transmit the local broadcast --

At column 11, line 23: "II. Protocols" should read -- I. Protocols --

At column 13, line 63: "programs on a specific local multicast address Im_1, and"
should read -- programs on a specific local multicast address Im_1 -- (unbold '1')

At column 14, line 50: "Im_1 which is assigned for local broadcasts (step 440). If"
should read -- Im_1 which is assigned for local broadcasts (step 440). If -- (unbold '1')

At column 19, line 11: "embodiment of the a system and method according to the"
should read -- embodiment of the system and method according to the --

UNITED STATES PATENT AND TRADEMARK OFFICE
CERTIFICATE OF CORRECTION

PATENT NO.        : 7,296,091 B1
APPLICATION NO.   : 09/596864
DATED             : November 13, 2007
INVENTOR(S)       : Ashutosh Dutta, Henning Schulzrinne and Yechiam Yemini It is certified that error appears in the above-identified patent and that said Letters Patent is hereby corrected as shown below:

At column 21, line 27: "shown in FIGS. 11A and 11B, symbols 1a, 1b, 1c represent" should read -- shown in FIGS. 11A and 11B, symbols Ia, Ib, Ic represent --

Signed and Sealed this

Third Day of March, 2009

JOHN DOLL
*Acting Director of the United States Patent and Trademark Office*